United States Patent [19]

Radke et al.

[11] Patent Number: 5,223,776
[45] Date of Patent: Jun. 29, 1993

[54] SIX-DEGREE VIRTUAL PIVOT CONTROLLER

[75] Inventors: Kathleen M. Radke, Plymouth; Robert E. DeMers, Roseville; David J. Lowry, Minneapolis; William C. Marshall, Jr., Columbia Heights; Jon M. Blomberg, Mound, all of Minn.

[73] Assignee: Honeywell Inc., Minneapolis, Minn.

[21] Appl. No.: 636,318

[22] Filed: Dec. 31, 1990

[51] Int. Cl.$^5$ .................. F16D 31/02; G05G 9/02
[52] U.S. Cl. .................... 318/568.1; 318/590; 318/563; 200/5 R; 364/146; 338/128; 74/471 XY
[58] Field of Search ............... 318/560-636; 340/710, 709; 74/471 XY, 525, 501.5 R; 338/128; 364/146; 200/1-6; 901/15, 28, 29, 47; 414/7, 5

[56] References Cited

U.S. PATENT DOCUMENTS

| | | |
|---|---|---|
| 3,771,037 | 11/1973 | Bailey, Jr. . |
| 3,784,746 | 1/1974 | Hess ........................ 200/4 |
| 3,936,014 | 2/1976 | Morin . |
| 4,012,014 | 3/1977 | Marshall . |
| 4,134,560 | 1/1979 | Messerschmidt . |
| 4,216,467 | 8/1980 | Colston . |
| 4,420,808 | 12/1983 | Diamond et al. . |
| 4,477,043 | 10/1984 | Repperger . |
| 4,531,080 | 7/1985 | Nordstrom et al. . |
| 4,555,960 | 12/1985 | King . |
| 4,569,244 | 2/1986 | Akerstrom . |
| 4,574,651 | 3/1986 | Nordstrom . |
| 4,641,123 | 2/1987 | Whitehead . |
| 4,660,828 | 4/1987 | Weiss . |
| 4,680,465 | 7/1987 | Stevens . |
| 4,706,006 | 10/1987 | Solomon . |
| 4,738,417 | 4/1988 | Wenger . |
| 4,795,952 | 1/1989 | Brandstetter . |
| 4,812,802 | 3/1989 | Nishiumi et al. . |
| 4,962,448 | 10/1990 | DeMaio et al. . |
| 4,990,842 | 2/1991 | Miyaoka ................ 318/590 |
| 5,007,300 | 4/1991 | Siva ................... 74/471 XY |

FOREIGN PATENT DOCUMENTS

| | | |
|---|---|---|
| 0363739 | 4/1990 | European Pat. Off. . |
| 8805942 | 8/1988 | PCT Int'l Appl. . |
| 2201758A | 9/1988 | United Kingdom . |

OTHER PUBLICATIONS

McAffee et al.: "A New Six-Degree-of-Freedom Force-Reflecting Hand Controller for Space Telerobotics", Apr. 1990, Presentation at The 24th Aerospace Mechanisms Symposium.

Marshall et al.: "A New Active Virtual Pivot Six-Degree-of-Freedom Hand Controller for Aerospace Applications" for presentation at The 25th Aerospace Mechanisms Symposium (May 1991) (not published yet).

Primary Examiner—Paul Ip
Attorney, Agent, or Firm—John G. Shudy, Jr.

[57] ABSTRACT

An active virtual pivot hand controller using motors to control reflective forces and torques. Degree of freedom parameters, stops, and reflective force rates may be easily modified without altering hardware. The location of the virtual pivot of the hand controller may be likewise readily changed.

12 Claims, 7 Drawing Sheets

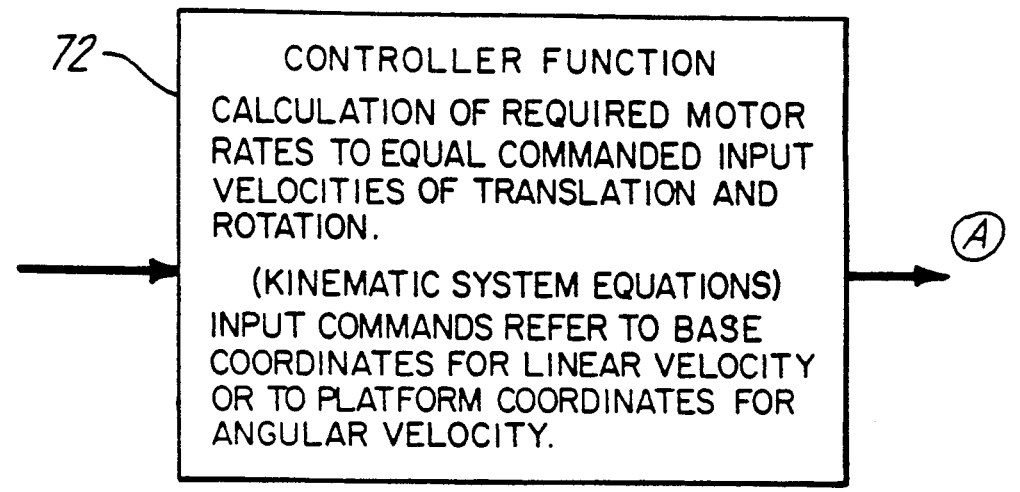
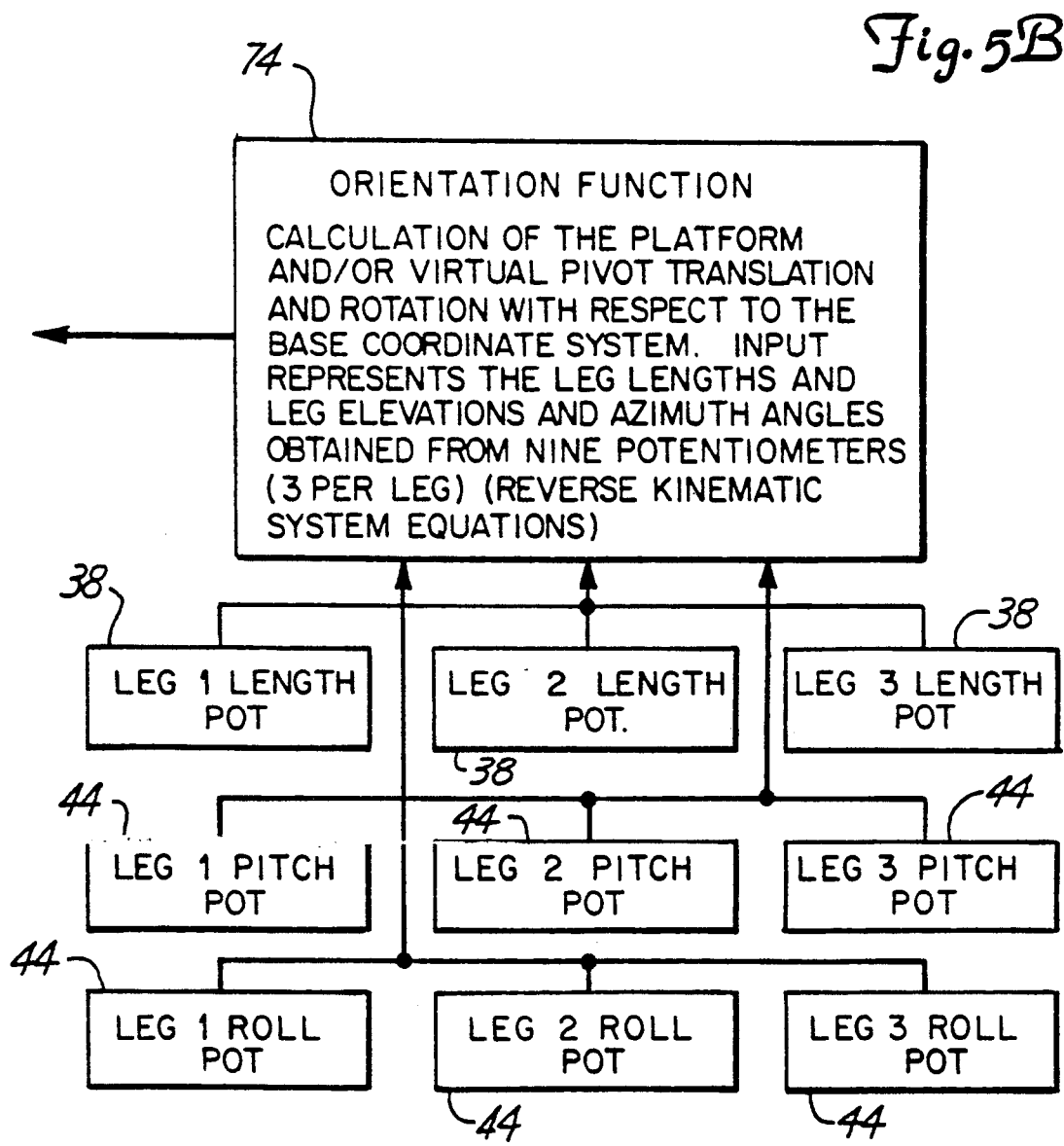
Fig. 5B

SIX-DEGREE VIRTUAL PIVOT CONTROLLER

FIELD OF THE INVENTION

The present invention pertains to hand controllers and particularly to aircraft hand controllers. More particularly, the invention pertains to displacement aircraft or space vehicle hand controllers.

RELATED ART

The related art involves conventional hand controllers which rotate about a fixed axis in the base, require movement of both the arm and the wrist, have a high force displacement gradient, and have either no or complex proprioceptive feedback.

In recent years, space and weight constraints in modern aircraft have resulted in compact fly-by-wire or fly-by-light control systems. Such systems reduce the size and weight of flight control hardware in the cockpit. In addition, these systems permit a side-arm controller configuration that reduces obstruction of the instrument panel area directly in front of the pilot. Two general configurations of those compact controllers have been developed--rigid and movable displacement. Rigid controllers measure the force of the control input and have no movement associated with input magnitude. Moveable controllers have a range of motion of about ±2 inches to ±4 inches associated with the magnitude of the control input. The force required to fully displace a moveable controller may be quite small, although the inclusion of a force-displacement gradient has been found to improve control performance.

Difficulties are associated with both types of hand controllers. Rigid controllers may produce severe operator fatigue due to a lack of proprioceptive feedback to tell the pilot how much force he is exerting. That difficulty can be reduced by allowing for a small (i.e., ±¼ inch) amount of displacement or wobble unrelated to the force-output function. Further, rigid controllers provide fairly imprecise control and suffer from input axis cross-coupling, again due to the poor proprioceptive feedback provided to the operator.

Moveable controllers can provide reasonable control when a fairly heavy-force output gradient (i.e., ≧±15 pounds at full displacement) is used; however, these force requirements result in operator fatigue. At lower force requirements, control imprecision and axis cross-coupling are resulting problems.

Some of these problems were solved upon the conception and development of a moveable hand controller configuration that permits accurate control while requiring a relatively low force-displacement gradient. Also, such hand controller is useful in a side-arm configuration in that it allows the operator's arm to remain essentially motionless in an arm rest while control inputs are made about the fulcrum of the wrist. When the operator provides an input, such hand controller assembly is rotated in an arc having its center at the operator's wrist and/or center is translational. The hand controller also has the advantage of rotation about the operator's wrist joint, thus requiring movement of the wrist only. In other words, that hand controller has a "virtual pivot" that permits inputs to be made about any point in space and the controller translates movement of the controller grip about a point in space (such as the operator's wrist joint) into movements of a sensor about an internal reference point thereby permitting one hand controller to optimally function for all hand sizes. However, that controller has a grip and a sensor platform with a small-displacement and a motion base with spring-loaded legs for flexibility. Such hand controller is disclosed in U.S. Pat. No. 4,962,448, by DeMaio et al., issued Oct. 9, 1990, and entitled "Virtual Pivot Hand Controller," which is herein incorporated by reference.

SUMMARY OF THE INVENTION

The present invention is still yet a further improvement on the related art. Not only does the present invention have a virtual pivot which accommodates variations in operator action, have six degrees of freedom, and variable pivot point locations; the invention is adaptable for providing various forces and torques and displacements and rotations and provides force feedback which simulates spring-type feedback but having different rates, various stop positions, variable damping, and a variety of reflective conditions to the controller environment including impact, proximity, limits, etc. The system of the invention has a hand controller incorporating system actuators, system sensors and feedback actuators which are connected to system control and force feedback control mechanisms which implement a variable control algorithm. The controller has a hand grip platform which is supported by telescoping legs. Linear actuators drive the telescoping motion in the legs. Motors drive radial angular motion at the universal joints which attach the legs to the base plate. A force/torque sensor is attached to the hand grip platform and monitors control inputs from an operator of the hand controller. There are angular potentiometers, linear potentiometers, and motor tachometers associated with the telescoping legs. The potentiometers provide a measurement of the position and attitude of the platform with respect to the base. Signals from the force/torque sensor, angular potentiometers, linear potentiometers and motor tachometers are input into the control system. The control system sends signals to the motors to drive the hand controller to the commanded configuration with the appropriate force and feel characteristics at the hand grip.

The virtual pivot of the hand controller system accommodates a wide variety of operator sizes with a "floating" pivot point. Motors and controllers replace springs of the related art hand controller and yet provides force feedback or "feel". Spring rates, spring tension, damping rates, stop positions, the number of control axes, the dimensions and range of control axes, and force reflection characteristics may be programmed with various values based on specific requirements into the control system. The programmability and flexibility of the hand controller system permits the controlling of a large and varied range of devices with a single hand controller. The hand controller system may be programmed to compensate for various gravities, various gravity and inertial effects, or for gravity-free environments. Applications of the hand controller system include use in space stations, space vehicles, helicopters, fixed-wing aircraft, underwater vehicles, robotic vehicles, robotic arm controls, and other applications.

BRIEF DESCRIPTION OF THE DRAWINGS

FIG. 5a, 5b and 5c constitute a signal flow diagram of the control system and motor channels.

DESCRIPTION OF THE PREFERRED EMBODIMENT

Figure 1:
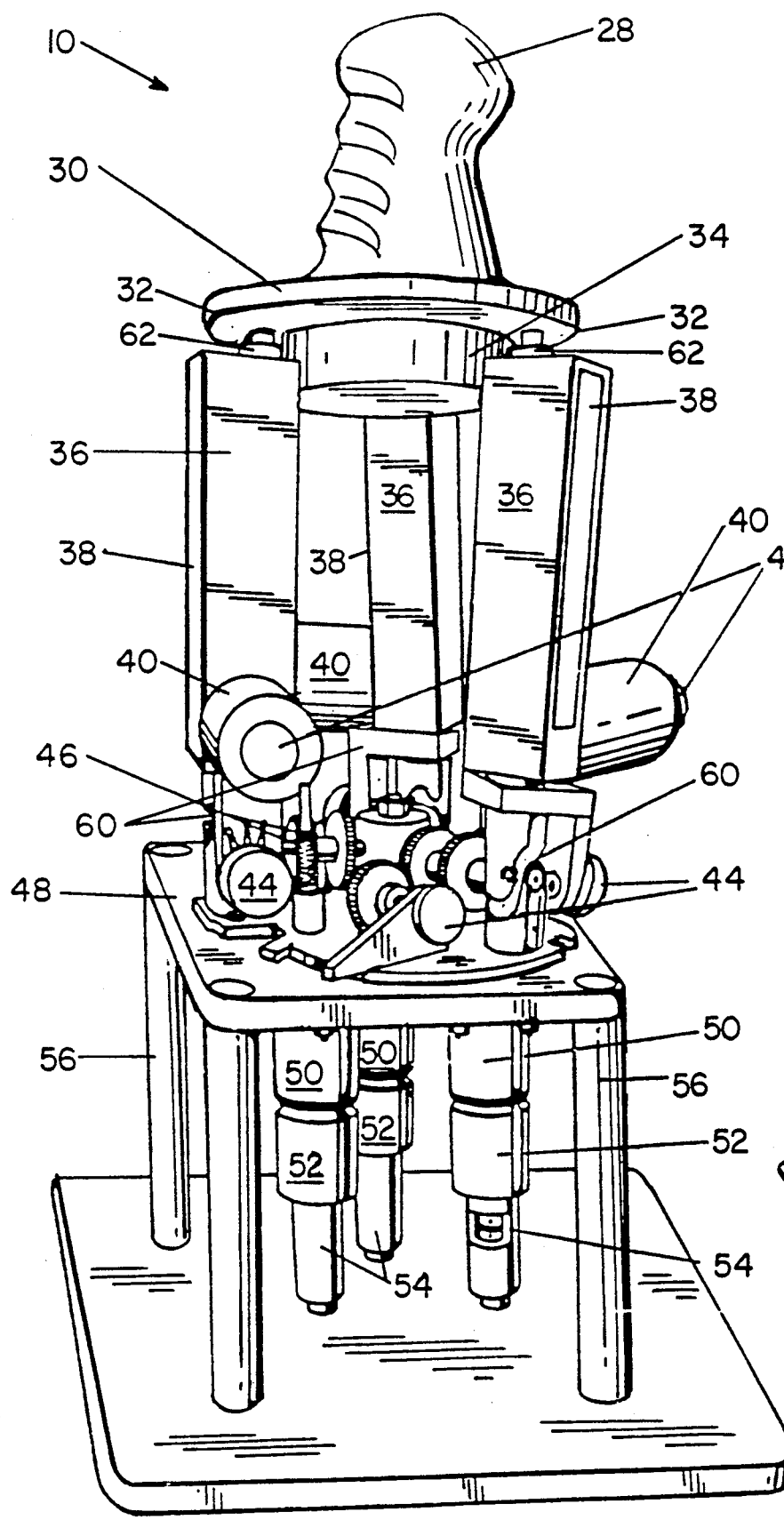
FIG. 1 is a drawing of hand controller.

FIG. 1 reveals an adaptable six degree of freedom virtual pivot hand controller 10. Virtual pivot hand controller 10 has a hand grip 28 for the operator's input. Hand grip 28 is connected through grip platform 30 to six degree of freedom force and torque sensor 34. Force and torque sensor 34 is an F/T series, model 75/250 sensor from Assurance Technologies, Inc., of Garner, NC 27529. Grip platform 30 is connected to shafts 62 via ball joints 32. Three shafts 62 extend into three linear actuators 36, respectively. Linear actuators 36 cause shafts 62 to extend out of actuators 36 or to withdraw into actuators 36. The amount of shaft 62 extending out of linear actuator 36 is measured by linear potentiometer 38. Linear actuators 36 are driven by motors 40 thereby causing the extension or withdrawal of shafts 62. The withdrawal or extension of shafts 62 via ball joints 32 raise, lower, tilt, rotate and/or laterally move grip platform 30 and hand grip 28. The activity of motors 40 driving linear actuators 36 is monitored by tachometers 42. Linear actuators 36 are attached to universal joints 60, respectively. The other ends of the universal joints 60 opposite of linear actuators 36, are effectively attached to base plate 48. Six potentiometers 44 are, respectively, attached to universal joints 60 for measuring the angles of linear actuators 36 relative to base plate 48. The angle of linear actuator is 36, relative to base plate 48, is driven and set by motors 52 via gear heads 50 and worm and worm wheel assemblies 46. Gear heads 50 are attached to motors 52 through base plate 48 to worms 46. Worms 46 drive worm wheels 46 which are attached to the portions of universal joints 60 that are rigidly attached to linear actuators 36, respectively. Worms 46 driving worm wheels 46 set linear actuators 36 and shafts 62 to particular angles of inclination. Motors 52 are monitored by tachometers 54. Base plate 48 is supported by a surface 58 with structural supports 56. Surface 58 represents the place or area upon which hand controller 10 is situated and mounted.

Figure 2:
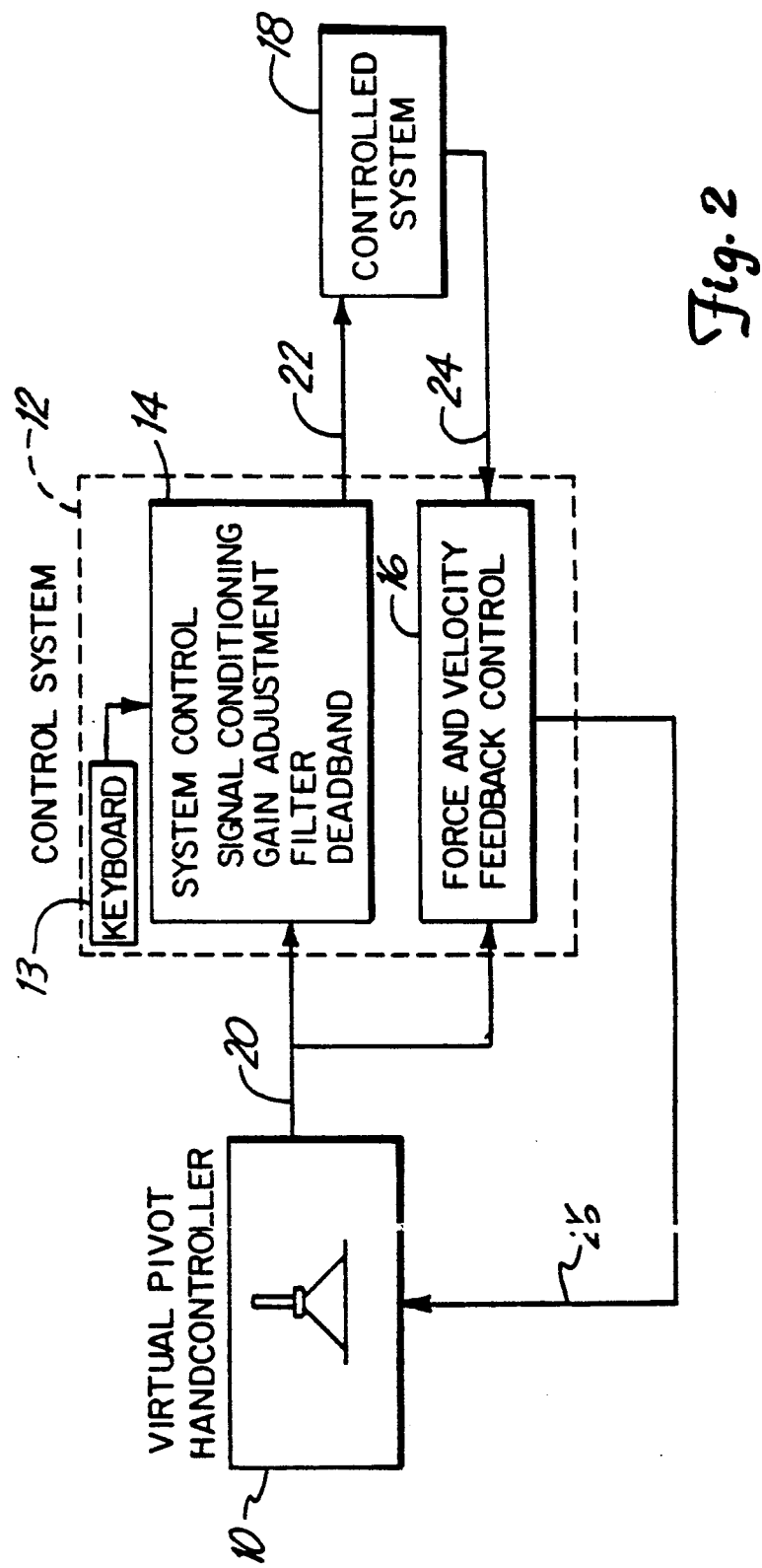
FIG. 2 is an overview diagram of the hand controller, control system, and the controlled system.
Figure 3:
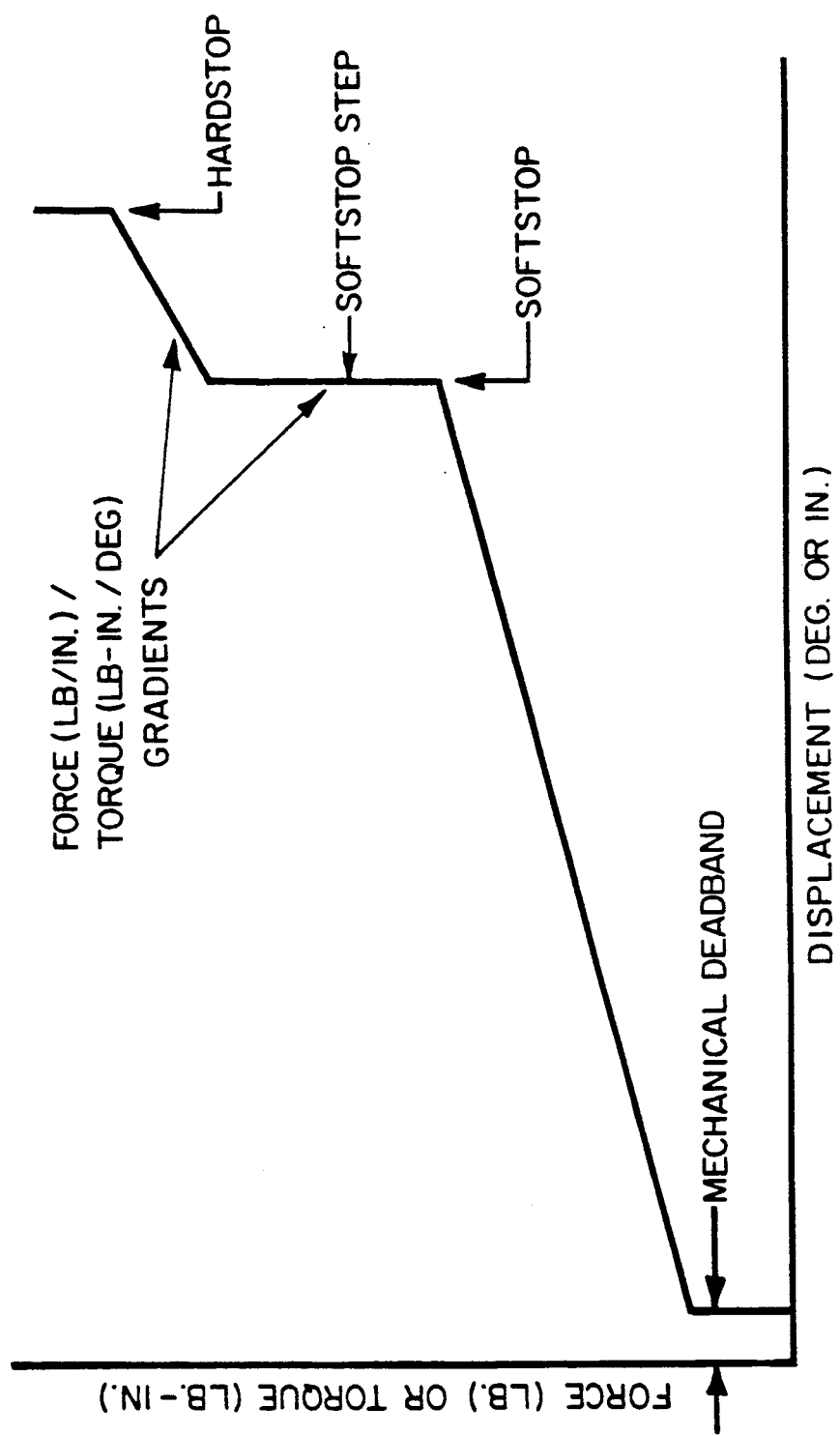
FIG. 3 is a graph showing the relationship of hand grip-applied force/torque versus hand controller movement displacement profiles.

FIG. 2 reveals an overall diagram of the adaptable six degree of freedom virtual pivot hand controller 10 system. Hand controller 10 outputs sensor signals 20 from six degree of freedom force and torque sensor 34, linear potentiometers 38, angular potentiometers 44, motor tachometers 42 and motor tachometers 54. Sensor signals 20 are input to control system 12 which is a processor and specifically a Motorola VMEbus 68020 single board microcomputer, having system control 14 and force feedback control 16. Force and torque sensor 34 which is attached to hand grip platform and hand grip monitors the control inputs from the operator. Control system 12, in response to sensor signals 20, sends feedback signals to motors 40 and 52 to drive hand controller 10 in accordance with the commanded configuration, having appropriate force and feel characteristics. The force and feel characteristics are determined by force feedback control 16 and response to sensor signals 20 revealing force, torque, position and rate, and signals from controlled system 18 sensors indicating proximity, force, field dynamics, etc., in response to driving signals 22 to system actuators such as motors, propulsion, etc. Hand controller 10 uses motor biasing to generate the sense the feel of springs, damping and mechanical deadbands as illustrated in FIG. 3. FIG. 3 is a graph of hand grip applied force and torque verses displacement profiles of hand grip 10.

Figure 4A:
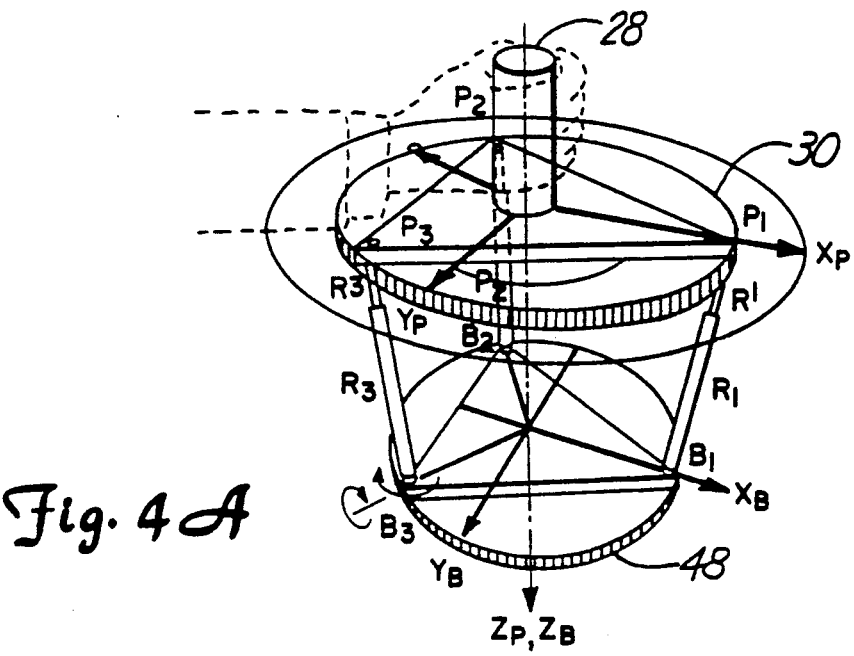
FIG. 4A-4C illustrates the vector relationships between base and platform coordinate frames of the virtual pivot hand controller.
Figure 4B:
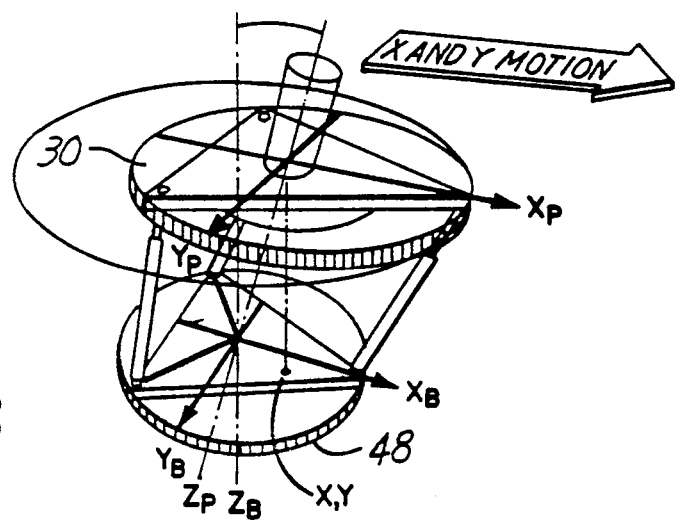
Figure 4C:
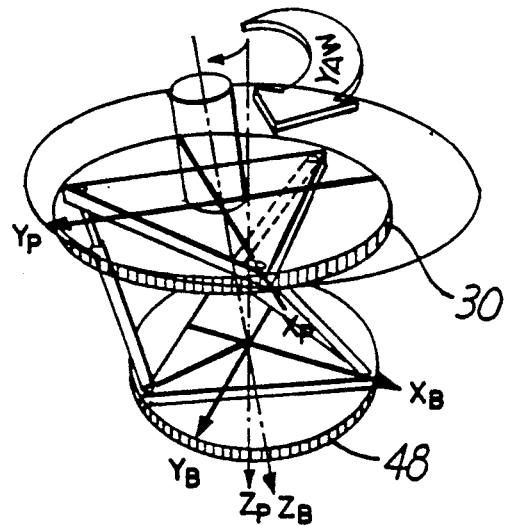

Control interface 22 required to determine hand control 10 orientation and translation in six degrees of freedom contains nine potentiometer measurements (three per leg) that define three position vectors of grip platform 10, corresponding to three fixed ball joints 32, with respect to the three base leg pivot points at the ends of shafts 62. During system calibration, a fixed displacement vector (from the origin of platform 30 coordinate frame) of the operator's wrist joint is estimated. FIG. 4A-4C show the vector relationships between base 48 and platform 30 coordinate frames. Processor or control system 12, through force feedback control 16, returns three Euler angles and three linear translations from nominal platform 30 origin. Additionally, force and torque sensor 34 inputs are used in either position or rate mode to command a six degree of freedom velocity that motorized legs 36 and shaft drives 46 are to deliver. Thus, processor or control system 12 must first solve the geometric task of computing orientation an translation, and then compute the requisite leg or shaft rotational and linear velocities that result in the commanded and controller state.

Kinematic solutions to the hand grip platform Euler angles (defining attitude angles) and linear displacements from the center of the coordinate frame are obtained by use of nine potentiometers, 38 and 44. Fewer potentiometers can accomplish the same task of monitoring as the nine potentiometers. Telescoping legs or shafts 62 (whose links are actuator 36 driven) are attached to platform 30 by ball joints 32 and to base 48 by double-gimbaled motorized joints 60. Outer gimbals 60 are rigidly attached to base 48, are motor 52 driven, and cause a roll motion about the leg or shaft 62 motor axis of rotation. Outer gimbal 62 axis defines the leg or shaft 62 coordinate frame X-axis for each of the three legs or shafts 62. These three axes are each oriented along the radial directions with respect to the center of base 48. This results in the forward base 48 point having its motor axes along the X-axis of the base 48 coordinate frame. Azimuth angles $\phi_i$ to the other two base 48 points have constant values of 120 and 240 degrees, respectively. Inner gimbals 60 allow rotation about the respective leg or shaft 62 pitch axes. Designating the length of the three legs 62 $d_i$, where i equals 1, 2, 3, and is defined $0 < d_{imin} < d_i < d_{imax}$. Then the position vectors of platform 30 ball joints 32 with respect to base 48 frame $S_B$:

$$P_i = E_i(\Psi_0) \cdot E(\theta_i, \phi_i) \cdot \begin{bmatrix} 0 \\ 0 \\ d_i \end{bmatrix} + P_{Bi}, i = 1, 2, 3 \quad (1)$$

where $$E(\theta_i, \phi_i) = \begin{bmatrix} \cos \theta_i & 0 & \sin \theta_i \\ \sin \theta_i \sin \phi_i & \cos \phi_i & -\cos \theta_i \sin \phi_i \\ -\sin \theta_i \sin \phi_i & \sin \phi_i & \cos \theta_i \cos \phi_i \end{bmatrix} \quad (2)$$

-continued and $$E_i(\Psi_0) = \begin{bmatrix} \cos\Psi_0 & -\sin\Psi_0 & 0 \\ \sin\Psi_0 & \cos\Psi_0 & 0 \\ 0 & 0 & 1 \end{bmatrix}; \quad (3)$$

$\Psi_0 = 0, 120, 240$ deg for $i = 1, 2, 3$

Processor of control system 12 is a Motorola VMEbus 68020-board microcomputer housed in a standard Motorola chassis having several analog-to-digital interface cards. Six tachometers 42 and 54 on three legs 62 measure motor speeds of leg-extending or retracting motors 40 and leg-angular rotating motors 52. There are two motors, 40 and 52, per leg 62. Linear potentiometers 38 measure leg 62 extension and two angular potentiometers 44 per leg 62 measure angles of each leg 62 relative to base 48. There is a total of nine potentiometers 38 and 44.

Rate and position control modes of hand controller 10 differ. In the position mode, removal of grip, force and torque commands from the operator causes hand controller 10 to remain at its latest attained attitude and linear displacement. Removal of input in the rate mode will cause a return of hand controller 10 to the initial displacement origin. Any of the six degrees of freedom of hand controller 10 may be locked out as desired. Software stops are provided to prevent hand controller 10 from running into hard stops which might cause damage.

Figure 5A:
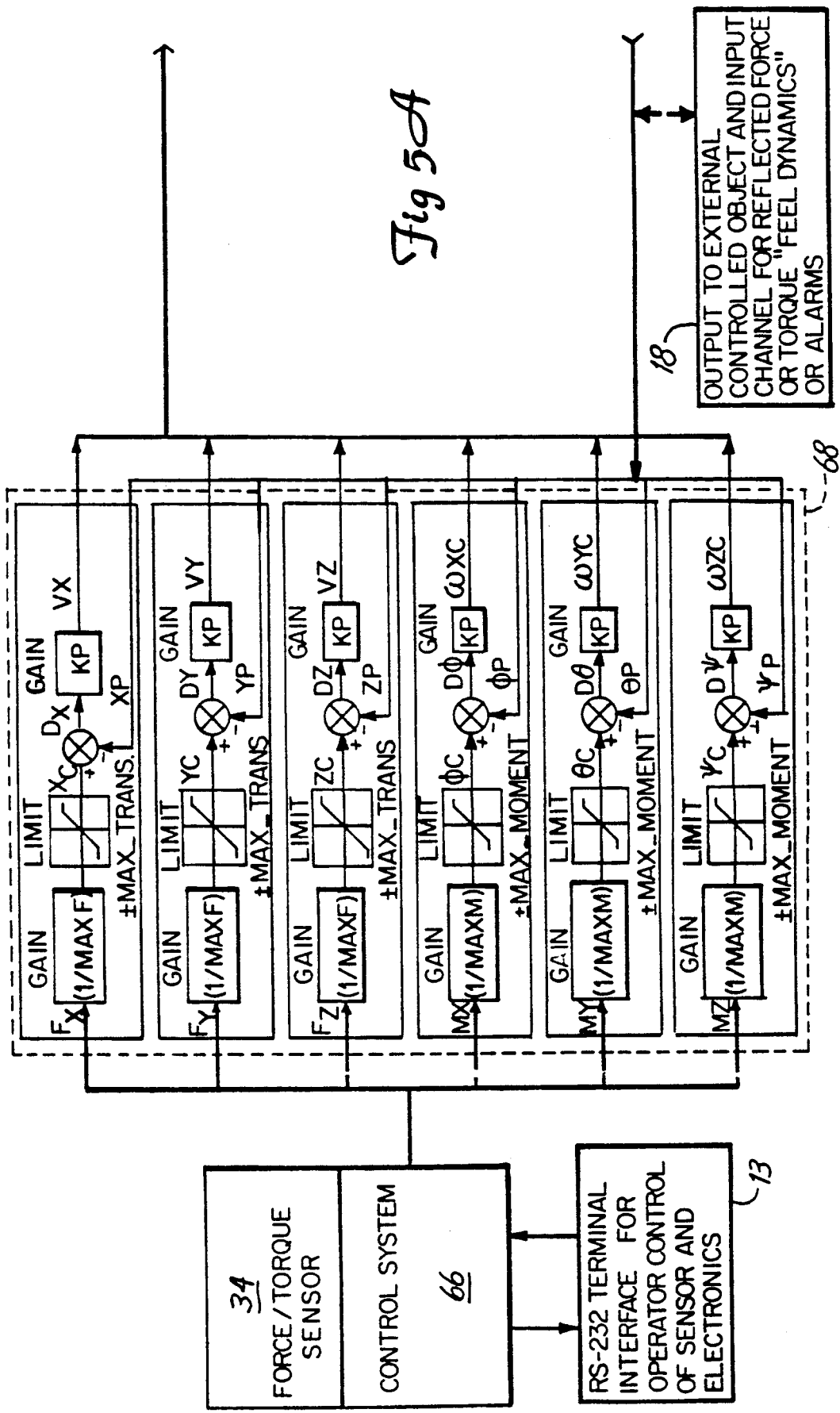
Figure 5C:
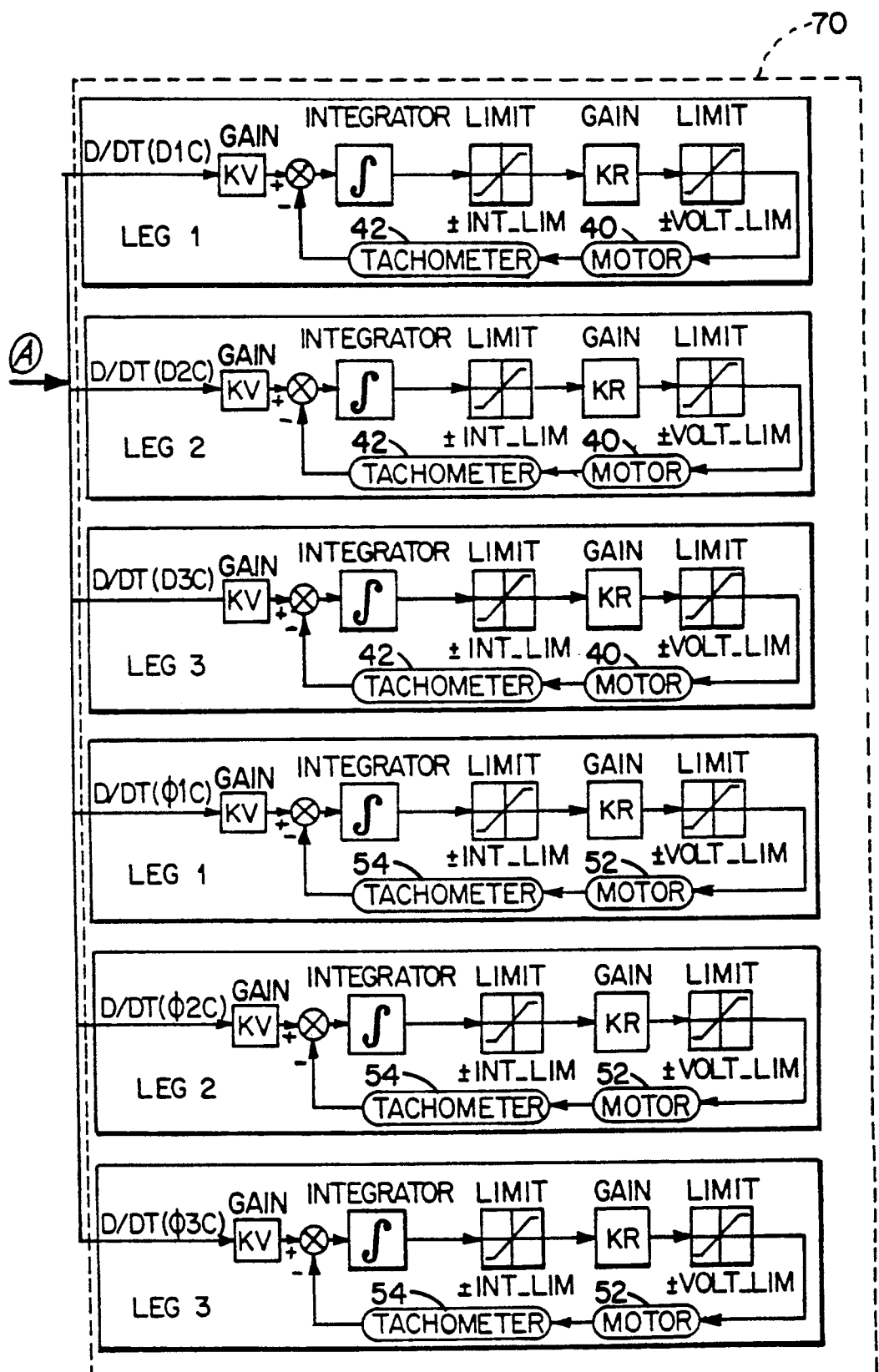

FIGS. 5a, 5b and 5c constitute an overview signal flow diagram of hand controller 10 input and motor control channels. This diagram has correlation with the program listing at the end of this description. Force/torque sensor 34 is a strain gauge type of sensor for detecting applied force and torque to hand grip 28 of controller 10. Interface 13 provides for keyboard or other type of input to the processor which includes input command processing 68 and motor command 70. Interface 13 is a RS-232 terminal interface for operator inputs of the controller 10 processor. Control system 66 provides for needed interaction among force and torque sensor 34, input command processing 68 and interface 13. Control system 66 includes sensor 34 electronics and control and may incorporate a Lord preprocessor and a Lord controller for sensor 34, from Assurance Technologies, Inc., of Garner, NC 27529 Controller function 72 incorporates software to perform the calculations of required motor rates to equal commanded input velocities of translation and rotation by incorporation kinematic system equations. Orientation function 74 incorporates software to perform the calculations of the platform and/or virtual pivot translation and rotation with respect to the base coordinate system. Inputs represent shaft or leg lengths, elevations and azimuth angles obtained from the nine potentiometers 38 and 44 (three per shaft or leg). Function 74 incorporates reverse kinematic system equations in its calculations. External object or device 18 receives input for external control and outputs signals for providing reflected force or torque (i.e., "feel" dynamics), or alarms.

The following describes the geometric relationships. Position vectors of the pivots are defined by $\overline{R}_{Bi}$ and $\overline{R}_{Pi}$, where $i = 1, 2, 3$, in the two separate frames $S_B$ (the base 48 frame) and $S_P$ (the platform 30 frame), results in $$R_{B1} = \begin{bmatrix} r_B \\ 0 \\ 0 \end{bmatrix}; R_{B2} = \begin{bmatrix} -r_B/2 \\ (\sqrt{3}/2)r_B \\ 0 \end{bmatrix}; R_{B3} = \begin{bmatrix} -r_B/2 \\ -(\sqrt{3}/2)r_B \\ 0 \end{bmatrix}$$

$$R_{P1} = \begin{bmatrix} r_P \\ 0 \\ 0 \end{bmatrix}; R_{P2} = \begin{bmatrix} -r_P/2 \\ (\sqrt{3}/2)r_P \\ 0 \end{bmatrix}; R_{P3} = \begin{bmatrix} -r_P/2 \\ -(\sqrt{3}/2)r_P \\ 0 \end{bmatrix}$$

$$R_C = \frac{1}{3}\sum_{i=1}^{3}(R_i + R_{Bi}) = \frac{1}{3}\sum_{i=1}^{3}R_i$$

since the sum $\Sigma R_{Bi} = 0$.
or $$R_C = \frac{1}{3}\sum_{i=1}^{3}E_i(\Psi_0) \cdot \begin{bmatrix} -d_i\sin\theta_i \\ d_i\cos\theta_i\sin\phi_i \\ -d_i\cos\theta_i\cos\phi_i \end{bmatrix}$$

The above dot represents a matrix dot product. Referring to FIG. 4, the platform 30 Xp unit vector is directed from the center toward $P_i$. The Yp unit vector is parallel to the line from $P_3$ to $P_2$. Then, $$X_P = \left(\frac{1}{r_P}\right)[R_1 - R_C] = \left(\frac{2}{3}R_1 - \frac{1}{3}(R_2 + R_3)\right)$$

$$Y_P = \left(\frac{1}{\sqrt{3}\,r_P}\right)[R_2 - R_3]$$

$$Z_P = X_P \times Y_P = \left(\frac{2\sqrt{3}}{9r_P^2}\right)[R_1 \times R_2 + R_2 \times R_3 + R_3 \times R_1]$$

The direction cosines of the Xp, Yp, and Zp unit vectors are the components of the preceding vector equations. The Euler rotation matrix from $S_B$ to $S_p$ is then $$E_{P/B} = \begin{bmatrix} X_P \cdot X_B & Y_P \cdot X_B & Z_P \cdot X_B \\ X_P \cdot Y_B & Y_P \cdot Y_B & Z_P \cdot Y_B \\ X_P \cdot Z_B & Y_P \cdot Z_B & Z_P \cdot Z_B \end{bmatrix} = \{e_{ij}\}.$$

The above dots represent vector dot products.

All information concerning the relative attitude orientation between the base 48 and platform 30 frames is contained in the Euler matrix $E_{P/B}$. Euler angles can be defined in 24 different ways depending on the sequence of rotations (in a positive sense about each of three axes). There are 12 permutations starting with either frame $S_p$ or $S_B$, or 24 total. Each set of three angels is not interchangeable (except for very small rotations). Each set does, however, result in the same rotation of one frame to another when applied in its specific sequence.

The following set arises from a yaw rotation about the SB z axis followed by a pitch rotation bout the y axis and a final roll about the x axis:

$\Psi_p = \tan^{-1}(e_{12}/e_{11}) = $ Yaw $\theta p = \sin^{-1}(-e13) = $ Pitch $\phi p = \tan^{-1}(e23/e33) = $ Roll Each rotation assumes the right-hand rule for positive sense. The inverse transformation performs a roll-pitch-yaw transformation (in that order) which is not uncommon in the aircraft industry.

The following describes the platform velocity equations. Tachometers 42 and 54 mounted on the handcontroller 10 legs and roll axis shafts are used in a velocity feedback controller 16 that drives each motorized leg 62 to null a separate commanded velocity. These six velocities are in turn computed according to the six signals from force/torque sensor 34 (after biasing to provide reflected force or torque dynamics for the operator).

At present, handgrip 28 force signals are interpreted as referenced to the base 48 coordinate frame as a linear velocity command. The coordinate system used in arbitrary and can be easily redefined in processor code and provided as an optional handcontroller 10 operating mode at a later time if desired.

The inertial velocity $\overline{V}_i$ of each leg 62 is composed of the linear velocity of the platform 30 center summed with the rotational velocity about the center, that is $$V_i = \frac{d}{dt} R_i = E_i(\Psi_0) \left( \frac{d}{dt} \left[ E_i(r_i, d_i) \cdot \begin{bmatrix} 0 \\ 0 \\ -d_i \end{bmatrix} \right] \right)$$

$$= V_C + \omega_P (R_i - R_C); \; i = 1, 2, 3$$

or $$V_i = \Omega_i(\Psi_0, \theta_i, \phi_i, d_i) \cdot \begin{bmatrix} \dot{\theta}_i \\ \dot{\phi}_i \\ \dot{d}_i \end{bmatrix} = V_C + \omega_P (R_i - R_C);$$

$i = 1, 2, 3$ where $\dot{\theta}_i$, $\dot{\phi}_i$, and $\dot{d}_i$ are the time rate of change of angles $\theta_i$, $\phi_i$, and leg length $d_i$ for each leg. Then, $$\begin{bmatrix} \dot{\theta}_i \\ \dot{\phi}_i \\ \dot{d}_i \end{bmatrix} = \Omega_i^{-1} [V_C + \omega_P (R_i - R_C)]; \; i = 1, 2, 3$$

In the above equation, only the expressions for leg roll and length rates are of interest as the handcontroller 10 leg 62 pitching rates are automatically driven by mechanical constraints. This solution requires inversion of a 3 by 3 matrix, where $\Omega_i(\Psi_0, \theta_i, \phi_i, d_i) =$ $$E_i(\Psi_0) \cdot \begin{bmatrix} 0 & -d_i \cos\theta_i & -\sin\theta_i \\ d_i \cos\theta_i \cos\phi_i & -d_i \sin\theta_i \sin\phi_i & \cos\theta_i \sin\phi_i \\ d_i \cos\theta_i \sin\phi_i & d_i \sin\theta_i \cos\phi_i & -\cos\theta_i \cos\phi_i \end{bmatrix};$$

$i = 1, 2, 3$

The platform 30 angular velocity vector input commands, $\omega_p$, above are referenced to $S_B$; if they are instead referenced to $S_p$, they are simply converted by the inverse Euler transformation as follows:

$$\omega_p = \begin{bmatrix} \omega_X \\ \omega_Y \\ \omega_Z \end{bmatrix}_B = E_{P/B}^{-1} \begin{bmatrix} \omega_{Xc} \\ \omega_{Yc} \\ \omega_{Zc} \end{bmatrix}_P$$

The inverse Euler matrix is the transpose of the matrix since the coordinate frame is orthogonal and Cartesian.

In summary, one feature of hand controller 10 is that the sensed location of the pivot point can be set arbitrarily. It can be sent through the center of grip 28, above or below it, or be centered inside the operator's wrist. For example, with a pivot point below grip 28, it would act like a conventional military aircraft hand controller having the pivot point where the control stick attaches to the floor or deck of the aircraft. However, with the pivot point above grip 28, the top of the grip would be seemingly attached to a point above it and the grip would swing freely below it. The programmability of the pivot point provides for maximum flexibility and adaptability of hand controller 10. These changes in location of pivot point can be made by entering the appropriate software commands in control system 12. An initial setting can be made by the operator through the movement of his or her wrist for setting the virtual pivot and control swing and rotation dimensions in accordance with and to match the wrist movement. Other operating characteristics can be changed simply by altering the software. Such things as break out forces, the degree of freedom available, damping rates, spring tensions and velocity rates can be modified without altering the hardware of control system 12 or hand controller 10. Based on information from the vehicle or object being controlled, the operator is given feedback through grip 28. This capability is force reflection and usually involves providing tactile feedback through grip 20 when the control object 18 (e.g., a robot arm or vehicle) contacts the target or other object. The combination of a programmable virtual pivot point having an active hand controller 10 allows the operator or user to configure hand controller 10 to match or meet the demands or needs of a particular task and user.

Motor-driven force feedback (microprocessor 12 control) replaces spring centering. Gradients of forces or torques versus displacements (in each of six axes), as shown in FIG. 2, are stored as parameters that can be modified by keyboard 13 input. Such modification provides adaptability or programmability of key hand controller 10 operating characteristics including sensed (virtual) pivot axes locations and range of motion in each axis, sensed spring force reflection or the feel of grip 28 (i.e., force/displacement gradients), the capability, as desired, to implement bilateral force feedback from system 18 being controlled (via motor control feedback) to the human operator and the capability of operator-mode control to introduce menu-driven commands (via the VMEbus single-board computer).

APPENDIX

Software Listings for the Virtual Pivot Hand Controller

| Filename | Description |
| --- | --- |
| handcntrlbowl.c | Stand-alone test program for the "controller" function. |
| myfunc50hz.2.29.90 | Main program (interrupt driven). |
| hc4.c | Merged "controller" and "orientation" functions. |
| hc4.h | Data structure definitions. |
| dtoa.h | Digital-to-analog conversions. |
| atod.h | Analog-to-digital conversions. |
| mymath.h | Sun Microsystems, Inc. utilities. |
| bowl.c | Bowl demonstration mode declarations. |
| cmd_declarations.h | Operator's terminal input commands. |
| cmd_definition.h | Data structure definitions. |
| makefile | Compiler macro command file. |

Note: Additional file listings attached are minor utilities and data type definitions or declarations common to many simmilar implementations.

handcntrlbowl.c         Thu Jan 11 17:05:52 1990        1

/* ..................Velocity Control Subroutine and Main Driver ..................*/
/*       Project: Virtual Pivot Hand Controler (IR&D F4925-3000-2822)            */
/*                                                                                */
/*       Description:    Theory of the C-Language code of this subprogram is
                         documented in the technical memo "Adaptable 6-DOF
                         Virtual Pivot Handcontroller: System Equations",
                         by W.C. Marshall, Dec 1989. Units are currently
                         "inches", radians, and unit time. Data I/O is via a data
                         structure as noted in the declarations.

Function "orient()" solves the "reverse kinematics"
                         problem given as input the desired platform's attitude
                         and relative position vector. Mean HEIGHT of the platform
                         specifies a positive distance along the "-z" axis. The "z"
                         axis is positive "down" with the "x" axis away from the
                         operator and "y" axis towards the right.

Function "controller()" computes the linear and angular
                         velocities (inches & radians per second) of each leg and
                         shaft motor. Input are the relative linear and angular
                         velocity vectors of the platform center wrt the base.
                         Platform attitude and relative position vectors wrt the
                         platform origin (9.5" above base origin) are also output.

In the actual mechanization, function "orient()" is not
                         presently needed as "pots" measure the actual leg and
                         shaft displacements. Note that "zero" for the leg is when
                         the overall leg is at 9.5 inches and "zero" for shaft
                         rotation is when the leg is "vertical".

/* .................. Start of Global Declarations ..................*/ include <math.h>
include <stdio.h>

```
handcntrlbowl.c           Thu Jan 11 17:05:52 1990          2 define RPLAT  2.5                    /* Platform radius               */
define RBASE  2.5                    /* Base radius to leg            */
#define HEIGHT 10.0                   /* Mean height of leg            */
#define RADDEG 57.29577951    /* Degrees per radian */
#define DEGRAD 0.01745329     /* Radians per degree */
#define TINY   1.0e-20                /* A "small" number   */
#define SR3D2  .86602540      /* = sqrt(3)/2   */
#define SR3D3  .57735027      /* = sqrt(3)/3   */
#define RPD2   RPLAT*.5       /* = (1/2)*RPLAT */
#define RBD2   RBASE*.5       /* = (1/2)*RBASE */
define HALF   .5             /* = (1/2)       */ typedef struct sensor                 /* Interface structure for "HandCntrl" I/O data */
{
    float d1,the1,phi1;               /* Leg #1 length & two angles       (Input)  */
    float d2,the2,phi2;               /* Leg #2 length & two angles       (Input)  */
    float d3,the3,phi3;               /* Leg #3 length & two angles       (Input)  */ float delx,dely,delz;             /* Current platform offset from zero position*/
    float phi,theta,psi;              /* Current platform roll,pitch,yaw (radians) */ float velx,vely,velz;             /* Desired translational rates              */
    float wx,wy,wz;                   /* Desired angular rates (rad./sec.)        */ float ph1dot,d1dot;               /* Angle & leg rate commands       (Output) */
    float ph2dot,d2dot;               /* Angle & leg rate commands       (Output) */
    float ph3dot,d3dot;               /* Angle & leg rate commands       (Output) */
};

/* List of functions used by "main" */ void bowl();
void controller();
void orient();
void quat();
void euler();
void matmpy();
void matran();
void matinv();
void transpose();
void mmult();

/* MISCELANEOUS */ static float  epb[3][3];              /* Euler transformation matrix (Base-To-Platform) */
static float  ebp[3][3];              /* Euler transformation matrix (Platform-To-Base) */ static float  e1b[3][3];              /* Leg #1 euler matrix Sb to L1
```

```
handcntrlbowl.c            Thu Jan 11 17:05:52 1990       3 static float e2b[3][3];         /* Leg #2 euler matrix Sb to L2          */
static float e3b[3][3];         /* Leg #3 euler matrix Sb to L3          */ static float e1[3][3];          /* Leg #1 angular rate transform matrix  */
static float e2[3][3];          /* Leg #2 angular rate transform matrix  */
static float e3[3][3];          /* Leg #3 angular rate transform matrix  */
static float e1in[3][3];        /* Inverse of e1 matrix                  */
static float e2in[3][3];        /* Inverse of e2 matrix                  */
static float e3in[3][3];        /* Inverse of e3 matrix                  */

/* KEY PARAMETER LIST DECLARATIONS */ static float ANGLE[3];          /* Euler angles phi,theta,psi wrt Sb     */
static float ARATE[3];          /* Platform rates Wx,Wy,Wz in Sb         */
static float RP[3];             /* Platform centerposition wrt Sb        */
static float VEL[3];            /* Platform velocity wrt Sb              */
static float R1[3];             /* Position of Leg #1 at top in Sb       */
static float R2[3];             /* Position of Leg #2 at top in Sb       */
static float R3[3];             /* Position of Leg #3 at top in Sb       */
static float V1[3];             /* Velocity of Leg#1 at top in Sb        */
static float V2[3];             /* Velocity of Leg#2 at top in Sb        */
static float V3[3];             /* Velocity of Leg#3 at top in Sb        */
static float RP1[3];            /* Rel. position of Leg #1 wrt RP[1]     */
static float RP2[3];            /* Rel. position of Leg #2 wrt RP[1]     */
static float RP3[3];            /* Rel. position of Leg #3 wrt RP[1]     */
static float XP[3];             /* Platform Sp unit vector coordinates   */
static float YP[3];             /* Platform Sp unit vector coordinates   */
static float ZP[3];             /* Platform Sp unit vector coordinates   */
static float OUT1[3];           /* Motor rates for Leg #1                */
static float OUT2[3];           /* Motor rates for Leg #2                */
static float OUT3[3];           /* Motor rates for Leg #3                */
static float PHIC;              /* Commanded initial roll orientation    */
static float THEC;              /* Commanded initial pitch orientation   */
static float PSIC;              /* Commanded initial yaw orientation     */
static float DELR[3];           /* Commanded initial position vector     */
static float RPC[3];            /* Platform position vector wrt Sb       */
static float R1b[3];            /*Computed Leg vectors in Sb             */
static float R2b[3];            /*Computed Leg vectors in Sb             */
static float R3b[3];            /*Computed Leg vectors in Sb             */
static float D1b[3];            /*Computed Leg vectors in Sb at B1       */
static float D2b[3];            /*Computed Leg vectors in Sb at B2       */
static float D3b[3];            /*Computed Leg vectors in Sb at B3       */
static float LD1[3],LD2[3],LD3[3]; /*Computed Leg vectors in SLi at B1 */
static float epbc[3][3];        /*Computed euler matrix Sb to Sp         */ static float ek2[3][3] = {(-HALF, SR3D2,.0),(-SR3D2,-HALF,.0),(.0,.0,1.0)};
                                /* Constant matrix Sb to SLi for Di[3]   */
``` handcntrlbowl.c          Thu Jan 11 17:05:52 1990

```
static float ek3[3][3] = {{-HALF,-SR3D2,.0},{ SR3D2,-HALF,.0},{.0,.0,1.0}};

static float prate[3];                          /* Buffer for grip angular rate input    */
static float pvel[3];                           /* Buffer for grip linear velocity input */
static float griploc[3] = {.0,.0,-3.13};        /* Grip position offset vector           */
static float grip[3];                           /* Grip vector in base coordinates       */
static float TEMP[3];                           /* Temporary vector storage              */
static float deltax,deltay,deltaz;              /* Used in main program                  */ static float d1,d2,d3;
static float the1,the2,the3;
static float phi1,phi2,phi3;
static float sthe1,sthe2,sthe3;
static float cthe1,cthe2,cthe3;
static float sphi1,sphi2,sphi3;
static float cphi1,cphi2,cphi3;
static float ph1d,ph2d,ph3d;
static float the1d,the2d,the3d;
static float d1d,d2d,d3d;
static float determ,temp;
static float d1c,d2c,d3c,d1c2,d2c2,d3c2;
static float phi1c,phi2c,phi3c;
static float the1c,the2c,the3c;

/*..................................................BOWL DEMO DECLARATIONS.................*/
static float RADIUS = 3.0;          /* Radius of bowl shape centered above origin           */
static float ALP = .78539816;       /* 45 deg. from vertical in radians                     */
static float PID2 = 1.57079633;     /* = (1/2)*PI radians or 90 deg.                        */
/*.........................*/ void bowl(PX,PY,xbowl,ybowl,zbowl,phibo,thebo,psibo)

float PX,PY;
float *xbowl,*ybowl,*zbowl;         /* Bowl parameters       -1.<PI<+1.                     */
float *phibo,*thebo,*psibo          /* Bowl rel.coord. wrt platform coord. origin           */
    ;                               /* Bowl surface attitudes                               */
{
float phi,the;

phi = PID2 - ALP*PX;
the = PID2 - ALP*PY;
*xbowl = RADIUS*cos(the)*cos(phi);
*ybowl = RADIUS*cos(the)*sin(phi);
*zbowl = RADIUS*sin(the) - RADIUS;
*phibo = PID2 - phi;
*thebo = PID2 - the;
*psibo = .0;
```

```
handcntrlbowl.c            Thu Jan 11 17:05:52 1990            5 return;
}
/*.................DEBUGING DECLARATIONS........................*/
static int BUG00 = 0;   /* -1 means set I(-UNUSED-)            */
static int BUG01 = 0;   /* -1 means print epb[i][j]            */
static int BUG02 = 0;   /* -1 means print ebp[i][j]            */
static int BUG03 = 0;   /* -1 means print R1,R2,R3,RP          */
static int BUG04 = 0;   /* -1 means print phid & did outputs   */
static int BUG05 = 0;   /* -1 means print V1 vectors           */
static int BUG06 = 0;   /* -1 means print euler angles         */
static int BUG07 = 0;   /* -1 means print IC attitude commands*/
static int BUG08 = 0;   /* -1 means print euler matrix result  */
static int BUG09 = 0;   /* -1 means print dic,theic, phiic     */
static int BUG10 = 0;   /* -1 means print di,thei, phii        */
static int BUG11 = 0;   /* -1 means print RPC[j]               */
static int BUG12 = 0;   /* -1means print Di[j]                 */

/* ******************************************************************* */ main()
{
int j;

float delta = .2;
float xb,yb,zb,thb,phb,psb;
float PX,PY;
struct sensor sdata;
j = 0;

DELR[0] = .0;
DELR[1] = .0;
DELR[2] = .0;
PHIC = .1;
THEC = .2;
PSIC = .3;

orient(&sdata);                 /* Compute platform leg orientation       */ sdata.velx = .0;                /* Set linear & angular velocities of the */
sdata.vely = .0;                /* Platform.Linear velocities are defined */
sdata.velz = 1.0;               /* wrt sb with "z" down, "x" forward and  */
sdata.wx = .0;                  /* "y" axis towards the right. Angular    */
sdata.wy = .0;
sdata.wz = 1.0;
``` handcntrlbowl.c          Thu Jan 11 17:05:52 1990          6

```
controller(&sdata);              /* Compute motor velocity control    */ deltax = sdata.delx;
deltay = sdata.dely;
deltaz = sdata.delz;

/*..................................................Bowl Demo Test.................................*/
PX = -1.;
PY = -1.;
for(j=0;j<10;j++)
{
    PX = PX + delta;
    PY = PY + delta;
    bowl(PX,PY,&xb,&yb,&zb,&phb,&thb,&psb);

printf("PX,PY = %2.3f %2.3f  \n", PX,PY);
    printf("xb,yb,zb = %2.3f %2.3f %2.3f  \n", xb,yb,zb);
    printf("phb,thb,psbb = %2.3f %2.3f %2.3f  \n", phb,thb,psb);
};

/* DEBUG LOGIC  CONTROL */ if(BUG01>0) printf("  01:epb[0][j]    = %2.3f %2.3f %2.3f  \n",epb[0][0],epb[0][1],epb[0][2]);
if(BUG01>0) printf("  01:epb[1][j]    = %2.3f %2.3f %2.3f  \n",epb[1][0],epb[1][1],epb[1][2]);
if(BUG01>0) printf("  01:epb[2][j]    = %2.3f %2.3f %2.3f  \n",epb[2][0],epb[2][1],epb[2][2]);
if(BUG02>0) printf("  02:ebp[0][j]    = %2.3f %2.3f %2.3f  \n",ebp[0][0],ebp[0][1],ebp[0][2]);
if(BUG02>0) printf("  02:ebp[1][j]    = %2.3f %2.3f %2.3f  \n",ebp[1][0],ebp[1][1],ebp[1][2]);
if(BUG02>0) printf("  02:ebp[2][j]    = %2.3f %2.3f %2.3f  \n",ebp[2][0],ebp[2][1],ebp[2][2]);
if(BUG03>0) printf("  03:R1,R2,R3,RP= %2.3f %2.3f %2.3f %2.3f  \n",R1[0],R2[0],R3[0],RP[0]);
if(BUG03>0) printf("  03:R1,R2,R3,RP= %2.3f %2.3f %2.3f %2.3f  \n",R1[1],R2[1],R3[1],RP[1]);
if(BUG03>0) printf("  03:R1,R2,R3,RP= %2.3f %2.3f %2.3f %2.3f  \n",R1[2],R2[2],R3[2],RP[2]);
if(BUG04>0) printf("  04:phid =%2.3f %2.3f %2.3f  \n",phid,ph2d,ph3d);
if(BUG04>0) printf("  04:did  =%2.3f %2.3f %2.3f  \n",d1d,d2d,d3d);
if(BUG05>0) printf("  05:V1= %2.3f %2.3f %2.3f  \n",V1[0],V1[1],V1[2]);
if(BUG05>0) printf("  05:V2= %2.3f %2.3f %2.3f  \n",V2[0],V2[1],V2[2]);
if(BUG05>0) printf("  05:V3= %2.3f %2.3f %2.3f  \n",V3[0],V3[1],V3[2]);
if(BUG06>0) printf("  06:phi,the,psi=%2.3f %2.3f %2.3f  \n",ANGLE[0],ANGLE[1],ANGLE[2]);
if(BUG07>0) printf("  07:PHIC,THEC,PSIC=%2.3f %2.3f %2.3f  \n",PHIC,THEC,PSIC);
if(BUG08>0) printf("  08:epbc[0][j]   = %2.3f %2.3f %2.3f  \n",epbc[0][0],epbc[0][1],epbc[0][2]);
if(BUG08>0) printf("  08:epbc[1][j]   = %2.3f %2.3f %2.3f  \n",epbc[1][0],epbc[1][1],epbc[1][2]);
if(BUG08>0) printf("  08:epbc[2][j]   = %2.3f %2.3f %2.3f  \n",epbc[2][0],epbc[2][1],epbc[2][2]);
if(BUG09>0) printf("  09:phic =%2.3f %2.3f %2.3f  \n",phi1c,phi2c,phi3c);
if(BUG09>0) printf("  09:thec =%2.3f %2.3f %2.3f  \n",the1c,the2c,the3c);
if(BUG09>0) printf("  09: dic =%2.3f %2.3f %2.3f  \n",d1c,d2c,d3c);
if(BUG10>0) printf("  10:phil=%2.3f %2.3f %2.3f  \n",phi1,phi2,phi3);
```

```
handcntrlbowl.c        Thu Jan 11 17:05:52 1990        7 if(BUG10>0) printf(" 10:the1=%2.3f %2.3f %2.3f   \n",the1,the2,the3);
if(BUG10>0) printf(" 10:   d1 =%2.3f %2.3f %2.3f   \n",d1,d2,d3);
if(BUG11>0) printf(" 11:RPC =%2.3f %2.3f %2.3f   \n",RPC[0],RPC[1],RPC[2]);
if(BUG12>0) printf(" 12:LD1[j] =%2.3f %2.3f %2.3f \n",LD1[0],LD1[1],LD1[2]);
if(BUG12>0) printf(" 12:LD2[j] =%2.3f %2.3f %2.3f \n",LD2[0],LD2[1],LD2[2]);
if(BUG12>0) printf(" 12:LD3[j] =%2.3f %2.3f %2.3f \n",LD3[0],LD3[1],LD3[2]);
if(BUG12>0) printf(" 12:delta[j] =%2.3f %2.3f %2.3f \n",deltax,deltay,deltaz);

printf(" J= %3d\n",j);
scanf("%2d",&j);
return;
}

/*............... Start of Orientation Control Function ................*/ void orient(sdata)
struct sensor *sdata;
{
int i,j;

euler(PHIC,THEC,PSIC,epbc);           /* Compute commanded euler matrix Sb to Sp)  */

RPC[0] = DELR[0];                      /* Compute position vector of platform wrt base */
RPC[1] = DELR[1];
RPC[2] = DELR[2] - HEIGHT;

R1b[0] = RPC[0] + RPLAT*epbc[0][0];   /* Compute Leg vectors wrt Sb              */
R1b[1] = RPC[1] + RPLAT*epbc[0][1];
R1b[2] = RPC[2] + RPLAT*epbc[0][2];

R2b[0] = RPC[0] + RPLAT*(SR3D2*epbc[1][0] - HALF*epbc[0][0]);
R2b[1] = RPC[1] + RPLAT*(SR3D2*epbc[1][1] - HALF*epbc[0][1]);
R2b[2] = RPC[2] + RPLAT*(SR3D2*epbc[1][2] - HALF*epbc[0][2]);

R3b[0] = RPC[0] + RPLAT*(-SR3D2*epbc[1][0] - HALF*epbc[0][0]);
R3b[1] = RPC[1] + RPLAT*(-SR3D2*epbc[1][1] - HALF*epbc[0][1]);
R3b[2] = RPC[2] + RPLAT*(-SR3D2*epbc[1][2] - HALF*epbc[0][2]);
                                       /* Compute D1 vectors wrt Sb (B1 to P1) */
D1b[0] = R1b[0] - RBASE;
D1b[1] = R1b[1];
D1b[2] = R1b[2];

D2b[0] = R2b[0] + HALF*RBASE;
D2b[1] = R2b[1] - SR3D2*RBASE;
D2b[2] = R2b[2];
``` handcntrlbowl.c        Thu Jan 11 17:05:52 1990        8

```
D3b[0] = R3b[0] + HALF*RBASE;
D3b[1] = R3b[1] + SR3D2*RBASE;
D3b[2] = R3b[2];                            /*Compute Leg length coord.  di   */ d1c2 = .0;
for(j=0;j<3;j++) d1c2 = d1c2 + D1b[j]*D1b[j];
d2c2 = .0;
for(j=0;j<3;j++) d2c2 = d2c2 + D2b[j]*D2b[j];
d3c2 = .0;
for(j=0;j<3;j++) d3c2 = d3c2 + D3b[j]*D3b[j];

/* Compute phi & theta motor angles */

/* Rotate to Leg Base frame   */ for(j=0;j<3;j++) LD1[j] = D1b[j];

matmpy(ek2,D2b,LD2);
matmpy(ek3,D3b,LD3);

d1c = sqrt(d1c2);
d2c = sqrt(d2c2);
d3c = sqrt(d3c2);

phi1c = atan2(LD1[1],d1c);
the1c = asin(-LD1[0]/sqrt(LD1[0]*LD1[0] + LD1[2]*LD1[2]));

phi2c = atan2(LD2[1],d2c);
the2c = asin(-LD2[0]/sqrt(LD2[0]*LD2[0] + LD2[2]*LD2[2]));

phi3c = atan2(LD3[1],d3c);
the3c = asin(-LD3[0]/sqrt(LD3[0]*LD3[0] + LD3[2]*LD3[2]));

/*..............*/                          /* Set output values   */ sdata->d1    = d1c;
sdata->the1  = the1c;
sdata->phi1  = phi1c;
sdata->d2    = d2c;
sdata->the2  = the2c;
sdata->phi2  = phi2c;
sdata->d3    = d3c;
sdata->the3  = the3c;
sdata->phi3  = phi3c;

return;
```

```
handcntrlbowl.c       Thu Jan 11 17:05:52 1990      9

/*........................................................End of orient function...................................*/

/*..................................Start of Velocity Control Function ...................................*/ void controller(sdata)
struct sensor *sdata;

{
int j;
float det1,det2,det3;

d1   = sdata->d1;                    /* Transfer input data from global storage */
    thel = sdata->thel;
    phi1 = sdata->phi1;
    d2   = sdata->d2;
    the2 = sdata->the2;
    phi2 = sdata->phi2;
    d3   = sdata->d3;
    the3 = sdata->the3;
    phi3 = sdata->phi3;

VEL[0]   = sdata->velx;              /* Get desired linear & angular velocities   */
    VEL[1]   = sdata->vely;              /* Input is assumed to be in Sb coord.       */
    VEL[2]   = sdata->velz;
    prate[0] = sdata->wx;                /*Input is assumed to be in Sp coord.        */
    prate[1] = sdata->wy;
    prate[2] = sdata->wz;

sthe1 = sin(the1);                   /* Compute sines & cosines   */
    cthe1 = cos(the1);
    sphi1 = sin(phi1);
    cphi1 = cos(phi1);

sthe2 = sin(the2);
    cthe2 = cos(the2);
    sphi2 = sin(phi2);
    cphi2 = cos(phi2);

sthe3 = sin(the3);
    cthe3 = cos(the3);
    sphi3 = sin(phi3);
    cphi3 = cos(phi3);
``` handcntrlbowl.c          Thu Jan 11 17:05:52 1990          10

/* Compute R1,R2,R3,RP vectors */

```
R1[0] = -d1*sthe1 + RBASE;
R1[1] =  d1*cthe1*sphi1;
R1[2] = -d1*cthe1*cphi1;

R2[0] =  d2*((HALF*sthe2) - (SR3D2*cthe2*sphi2)) - RBD2;
R2[1] =  d2*((-SR3D2*sthe2) - (HALF*cthe2*sphi2)) + SR3D2*RBASE;
R2[2] = -d2*cthe2*cphi2;

R3[0] =  d3*((HALF*sthe3) +( SR3D2*cthe3*sphi3)) - RBD2;
R3[1] =  d3*((SR3D2*sthe3) - (HALF*cthe3*sphi3)) - SR3D2*RBASE;
R3[2] = -d3*cthe3*cphi3;
                            /* Compute Platform origin position vector*/
for(j=0; j<3; j++) RP[j] = (1.0/3.0)*(R1[j] + R2[j] + R3[j]);

/* Compute euler matrix epb[i][j] */
for(j=0;j<3;j++) XP[j] = (R1[j] - RP[j])/RPLAT;
for(j=0;j<3;j++) YP[j] = (R2[j] - R3[j])*(SR3D3/RPLAT);
ZP[0] = (XP[1]*YP[2]) - (XP[2]*YP[1]);
ZP[1] = (XP[2]*YP[0]) - (XP[0]*YP[2]);
ZP[2] = (XP[0]*YP[1]) - (XP[1]*YP[0]);

for(j=0;j<3;j++) epb[0][j] = XP[j];
for(j=0;j<3;j++) epb[1][j] = YP[j];
for(j=0;j<3;j++) epb[2][j] = ZP[j];

/* Obtain euler matrix ebp[i][j] */
transpose(epb,ebp);

/* Convert prate[1] to Sb coord. */
matmpy(ebp,prate,ARATE);

/* Compute Leg postion wrt Sp in Sb */
for(j=0;j<3;j++) RP1[j] = R1[j] - RP[j];
for(j=0;j<3;j++) RP2[j] = R2[j] - RP[j];
for(j=0;j<3;j++) RP3[j] = R3[j] - RP[j];

/* Compute linear velocity of legs */
V1[0] = VEL[0] + (ARATE[1]*RP1[2] - ARATE[2]*RP1[1]);
V1[1] = VEL[1] + (ARATE[2]*RP1[0] - ARATE[0]*RP1[2]);
V1[2] = VEL[2] + (ARATE[0]*RP1[1] - ARATE[1]*RP1[0]);

V2[0] = VEL[0] + (ARATE[1]*RP2[2] - ARATE[2]*RP2[1]);
V2[1] = VEL[1] + (ARATE[2]*RP2[0] - ARATE[0]*RP2[2]);
V2[2] = VEL[2] + (ARATE[0]*RP2[1] - ARATE[1]*RP2[0]);

V3[0] = VEL[0] + (ARATE[1]*RP3[2] - ARATE[2]*RP3[1]);
V3[1] = VEL[1] + (ARATE[2]*RP3[0] - ARATE[0]*RP3[2]);
V3[2] = VEL[2] + (ARATE[0]*RP3[1] - ARATE[1]*RP3[0]);
```

```
handcntrlbowl.c           Thu Jan 11 17:05:52 1990           11

/* Compute rate transform matrices        */ e1[0][0]  =   .0;
    e1[1][0]  =   d1*cthe1*cphi1;
    e1[2][0]  =   d1*cthe1*sphi1;
    e1[0][1]  =  -d1*cthe1;
    e1[1][1]  =  -d1*sthe1*sphi1;
    e1[2][1]  =   d1*sthe1*cphi1;
    e1[0][2]  =  -sthe1;
    e1[1][2]  =   cthe1*sphi1;
    e1[2][2]  =  -cthe1*cphi1;

e2[0][0]  =   d2*(-SR3D2*cthe2*cphi1);
    e2[1][0]  =   d2*(   -HALF*cthe2*cphi2);
    e2[2][0]  =   d2*cthe2*sphi2;
    e2[0][1]  =   d2*((HALF*cthe2)  +  (SR3D2*sthe2*sphi2));
    e2[1][1]  =   d2*((-SR3D2*cthe2) + (HALF*sthe2*sphi2));
    e2[2][1]  =   d2*sthe2*cphi2;
    e2[0][2]  =   (  HALF*sthe3)   -   (SR3D2*cthe3*sphi3);
    e2[1][2]  =   (-SR3D2*sthe3)   -   (HALF*cthe3*sphi3);
    e2[2][2]  =  -cthe3*cphi3;

e3[0][0]  =   d3*(SR3D2*cthe3*cphi3);
    e3[1][0]  =   d3*(   -HALF*cthe3*cphi3);
    e3[2][0]  =   d3*cthe3*sphi3;
    e3[0][1]  =   d3*((HALF*cthe3)  +  (SR3D2*sthe3*sphi3));
    e3[1][1]  =   d3*((SR3D2*cthe3) + (HALF*sthe2*sphi3));
    e3[2][1]  =   d3*sthe3*cphi3;
    e3[0][2]  =   (  HALF*sthe3)   +   (SR3D2*cthe3*sphi3);
    e3[1][2]  =   ((SR3D2*sthe3)   -   (HALF*cthe3*sphi3));
    e3[2][2]  =  -cthe3*cphi3;

/* Form final matrices   */
    matinv(e1,e1in,&det1);
    matinv(e2,e2in,&det2);
    matinv(e3,e3in,&det3);

/* Compute motor rate commands  */
    matmpy(e1in,V1,OUT1);
    matmpy(e2in,V2,OUT2);
    matmpy(e3in,V3,OUT3);

ph1d  =  OUT1[0];
    ph2d  =  OUT2[0];
    ph3d  =  OUT3[0];
    d1d   =  OUT1[2];
    d2d   =  OUT2[2];
    d3d   =  OUT3[2];

/* Compute ONE SET of euler angles (of 12!) */
``` handcntrlbowl.c        Thu Jan 11 17:05:52 1990        12

```
        ANGLE[0] = atan2(epb[1][2],epb[2][2]);     /* This set is psi,theta,phi (in order) Sb to Sp    */
        ANGLE[1] = asin(-epb[0][2]);
        ANGLE[2] = atan2(epb[0][1],epb[0][0]);
/*............*/

/* Transfer Output Data */ sdata->ph1dot  = ph1d;
        sdata->ph2dot  = ph2d;
        sdata->ph3dot  = ph3d;

sdata->d1dot   = d1d;
        sdata->d2dot   = d2d;
        sdata->d3dot   = d3d;

matmpy(ebp,griploc,grip);
        sdata->delx    = RP[0] + grip[0];
        sdata->dely    = RP[1] + grip[1];
        sdata->delz    = RP[2] + HEIGHT + grip[2];

sdata->phi     = ANGLE[0];
        sdata->theta   = ANGLE[1];
        sdata->psi     = ANGLE[2];

return;
}
/*..................................................End of Velocity Control Fn..................................*/ void quat(q1,q2,q3,q4, trans)

float q1,q2,q3,q4;
float trans[3][3];

{                                                       /*Compute new transformation matrix          */ trans[0][0] =  (q1*q1 + q2*q2 + q3*q3 + q4*q4);
    trans[0][1] =  2.*(q2*q3 + q1*q4);
    trans[0][2] =  2.*(q2*q4 - q1*q3);
    trans[1][0] =  2.*(q2*q3 - q1*q4);
    trans[1][1] =  (q1*q1 -q2*q2 + q3*q3 - q4*q4);
    trans[1][2] =  2.*(q3*q4 + q1*q2);
    trans[2][0] =  2.*(q2*q4 + q1*q3);
    trans[2][1] =  2.*(q3*q4 - q1*q2);
    trans[2][2] =  (q1*q1 - q2*q2 - q3*q3 + q4*q4);
``` handcntrlbowl.c      Thu Jan 11 17:05:52 1990      13

```
    return;
}
/*.................................
 .......... */
void euler(phi,the,psi,mat)

float phi,the,psi;
float mat[3][3];
{
    float sphi,cphi,sthe,cthe,spsi,cpsi;

/*............. Euler Matrix Computation .............*/
    /* Compute euler rotation matrix from Loc.Vert. to Body */ sthe = sin(the);
    cthe = cos(the);
    spsi = sin(psi);
    cpsi = cos(psi);
    sphi = sin(phi);
    cphi = cos(phi);

mat[0][0] = cthe*cpsi;
    mat[0][1] = cthe*spsi;
    mat[0][2] = -sthe;
    mat[1][0] = sphi*sthe*cpsi - cphi*spsi;
    mat[1][1] = sphi*sthe*spsi + cphi*cpsi;
    mat[1][2] = sphi*cthe;
    mat[2][0] = cphi*sthe*cpsi + sphi*spsi;
    mat[2][1] = cphi*sthe*spsi - sphi*cpsi;
    mat[2][2] = cphi*cthe;

return;
}
/*.................................
 .......... */
void matmpy(a,b,c)
                                /* Matrix(3x3) times vector(1x3) */
                                /* Calling sequence:             */
                                /*    float m[3][3] ;            */
                                /*    float v[3] ;               */
                                /*    matmpy(m,v,v)              */ float a[3][3] ;
```

```
handcntrlbowl.c         Thu Jan 11 17:05:52 1990      14 float b[3] ;
        float c[3] ;

{
        float t[3] ;

t[0] = a[0][0]*b[0] + a[0][1]*b[1] + a[0][2]*b[2] ;
        t[1] = a[1][0]*b[0] + a[1][1]*b[1] + a[1][2]*b[2] ;
        t[2] = a[2][0]*b[0] + a[2][1]*b[1] + a[2][2]*b[2] ;

c[0] = t[0] ;
        c[1] = t[1] ;
        c[2] = t[2] ;
        }
/* ............................................... End "matmpy" Code ............... */ void matran(a,b,c)                      /* Matrix transposition multiply*/
                                        /* Matrix(3x3) times vector(1x3) */
                                        /* Calling sequence:            */
                                        /*      float m[3][3] ;         */
                                        /*      float v[3] ;            */
                                        /*      matran(m,v,v)           */ float a[3][3] ;
        float b[3] ;
        float c[3] ;

{
        float t[3] ;

t[0] = a[0][0]*b[0] + a[1][0]*b[1] + a[2][0]*b[2] ;
        t[1] = a[0][1]*b[0] + a[1][1]*b[1] + a[2][1]*b[2] ;
        t[2] = a[0][2]*b[0] + a[1][2]*b[1] + a[2][2]*b[2] ;

c[0] = t[0] ;
        c[1] = t[1] ;
        c[2] = t[2] ;
        }
/* ............................................... End "matran" Code ............... */ void matinv(a,b,det)                    /* Matrix (3x3) Inverse & Determinant)  */

/* Calling sequence:            */
                                        /*      float m[3][3] ;         */
                                        /*      float n[3][3] ;         */
                                        /*      float *det              */
```

```c
                      /*    matinv(m,n,&det)    */

/* Cramer's Rule used to compute inverse.            */
                      /* Inverse of m to n (with determinant returned always) */
                      /* If det "smaller" than "tiny", inverse not returned */ float a[3][3] ;
float b[3][3] ;
float *det ;
{
*det    =    a[0][0] * (a[1][1]*a[2][2] - a[1][2]*a[2][1])
           + a[1][0] * (a[2][1]*a[0][2] - a[0][1]*a[2][2])
           + a[2][0] * (a[0][1]*a[1][2] - a[1][1]*a[0][2]);

if (fabs(*det)<TINY) return;

temp = 1.0/(*det);

b[0][0] =  temp * (a[1][1]*a[2][2] - a[1][2]*a[2][1]);
b[1][0] = -temp * (a[1][0]*a[2][2] - a[1][2]*a[2][0]);
b[2][0] =  temp * (a[1][0]*a[2][1] - a[1][1]*a[2][0]);

b[0][1] = -temp * (a[0][1]*a[2][2] - a[0][2]*a[2][1]);
b[1][1] =  temp * (a[0][0]*a[2][2] - a[0][2]*a[2][0]);
b[2][1] = -temp * (a[0][0]*a[2][1] - a[0][1]*a[2][0]);

b[0][2] =  temp * (a[0][1]*a[1][2] - a[0][2]*a[1][1]);
b[1][2] = -temp * (a[0][0]*a[1][2] - a[0][2]*a[1][0]);
b[2][2] =  temp * (a[0][0]*a[1][1] - a[0][1]*a[1][0]);
}

/* ............................................. End "matinv" Code ............*/ void mmult(a,b,c)                /* Matrix(3x3) times matrix(3x3)*/
                                 /* Calling sequence:            */
                                 /*      float a[3][3] ;         */
                                 /*      float b[3][3] ;         */
                                 /*      float c[3][3] ;         */
                                 /*      mmult(a,b,c) ;          */
                                 /*      (a)x(b) -> (c)          */
float a[3][3] ;
float b[3][3] ;
float c[3][3] ;
{
c[0][0] = a[0][0]*b[0][0] + a[0][1]*b[1][0] + a[0][2]*b[2][0] ;
``` handcntrlbowl.c          Thu Jan 11 17:05:52 1990          16

```
    c[1][0] = a[1][0]*b[0][0] + a[1][1]*b[1][0] + a[1][2]*b[2][0] ;
    c[2][0] = a[2][0]*b[0][0] + a[2][1]*b[1][0] + a[2][2]*b[2][0] ;

c[0][1] = a[0][0]*b[0][1] + a[0][1]*b[1][1] + a[0][2]*b[2][1] ;
    c[1][1] = a[1][0]*b[0][1] + a[1][1]*b[1][1] + a[1][2]*b[2][1] ;
    c[2][1] = a[2][0]*b[0][1] + a[2][1]*b[1][1] + a[2][2]*b[2][1] ;

c[0][2] = a[0][0]*b[0][2] + a[0][1]*b[1][2] + a[0][2]*b[2][2] ;
    c[1][2] = a[1][0]*b[0][2] + a[1][1]*b[1][2] + a[1][2]*b[2][2] ;
    c[2][2] = a[2][0]*b[0][2] + a[2][1]*b[1][2] + a[2][2]*b[2][2] ;
}
/* .............................................. End "mmult" Code ............. */

/* Matrix(3x3) transpose to matrix(3x3)*/
                    /* Calling sequence:                   */
                    /*     float a[3][3] ;                 */
                    /*     float b[3][3] ;                 */
                    /*     transpose(a,b,) ;               */
                    /*     (a)' -> (b)                     */
                    /*                                     */
void transpose(a,b)
    float a[3][3] ;
    float b[3][3] ;
{
    b[0][0] = a[0][0] ;
    b[1][0] = a[0][1] ;
    b[2][0] = a[0][2] ;
    b[0][1] = a[1][0] ;
    b[1][1] = a[1][1] ;
    b[2][1] = a[1][2] ;
    b[0][2] = a[2][0] ;
    b[1][2] = a[2][1] ;
    b[2][2] = a[2][2] ;
}
/* .............................................. End "mmult" Code ............. */
```

```
myfunc50hz.2.28.90        Wed Feb 28 14:21:05 1990          1 include "../include/mem_map.h"
include "../include/dtoa.h"
#include "../include/hc4.h"

#define  extern
#include "../include/vp.h"
undef   extern define DOIP  asm("   bset    #$5,$fff80001");

unsigned long card[3];
double lim();
struct sensor hc;
double phic,thac,psic,xc,yc,zc,px,py;

/*----------------------------------------------------------------*/
myfunc50hz()
{
static int k25 = 0;
static int k10 = 1;
static int k05 = 2;
static int k02 = 3;
static int k01 = 4;

/* asm("       bset    #$5,$fff80001"); */
asm("   bclr    #$5,$fff80001");

k25 = (k25 + 1) % 2;
k10 = (k10 + 1) % 5;
k05 = (k05 + 1) % 10;
k02 = (k02 + 1) % 25;
k01 = (k01 + 1) % 50;

do50hz();

if (k25 == 0)
{
} f (k10 == 0)
{
} f (k05 == 0)
{
}
``` myfunc50hz.2.28.90          Wed Feb 28 14:21:05 1990                2

```
if (k02 == 0)
{
} if (k01 == 0)
{
}

/* asm("        bclr     #$5,$fff80001"); */
}
/*-------------------------------------------------------------*/
initmyfunc50hz()
{
vp.igo = INT_OFF;
vp.mod = POS_MODE;
vp.dof = THREE_DOF;
vp.bol = BOWL_OFF;
vp.kp  =   1.0;
vp.kr  =  15.0;

MAX_FORCE  =  50.0;
MAX_MOMENT = 200.0;

/* initialize fts, loc, atod, and dtoa */ vio_init(BIM_ADDR);
atod_init(IO_LEVEL,VME_LEVEL,VECTOR);
dtoa_init();

card[0] = dtoa_define(A_BASE_ADDR,A_RANGE);
card[1] = dtoa_define(B_BASE_ADDR,B_RANGE);
card[2] = atod_define(C_BASE_ADDR,C_RANGE,C_CHANNELS);

/* assign channels and cards for pots and tachs */ leg1.lin.rat.chn = 0;    leg1.lin.rat.crd = 2;
leg1.lin.pos.chn = 1;    leg1.lin.pos.crd = 2;
leg1.rad.pos.chn = 2;    leg1.rad.pos.crd = 2;
leg1.tan.rat.chn = 3;    leg1.tan.rat.crd = 2;
leg1.tan.pos.chn = 4;    leg1.tan.pos.crd = 2;

leg2.lin.rat.chn = 5;    leg2.lin.rat.crd = 2;
leg2.lin.pos.chn = 6;    leg2.lin.pos.crd = 2;
leg2.rad.pos.chn = 7;    leg2.rad.pos.crd = 2;
leg2.tan.rat.chn = 8;    leg2.tan.rat.crd = 2;
leg2.tan.pos.chn = 9;    leg2.tan.pos.crd = 2;
``` myfunc50hz.2.28.90           Wed Feb 28 14:21:05 1990                3

```
leg3.lin.rat.chn = 10;  leg3.lin.rat.crd = 2;
leg3.lin.pos.chn = 11;  leg3.lin.pos.crd = 2;
leg3.rad.pos.chn = 12;  leg3.rad.pos.crd = 2;
leg3.tan.rat.chn = 13;  leg3.tan.rat.crd = 2;
leg3.tan.pos.chn = 14;  leg3.tan.pos.crd = 2;

/* assign channels and cards for motor drivers */ leg1.lin.mot.chn = 1;  leg1.lin.mot.crd = 0;
leg1.tan.mot.chn = 2;  leg1.tan.mot.crd = 0;

leg2.lin.mot.chn = 3;  leg2.lin.mot.crd = 0;
leg2.tan.mot.chn = 4;  leg2.tan.mot.crd = 0;

leg3.lin.mot.chn = 1;  leg3.lin.mot.crd = 1;
leg3.tan.mot.chn = 2;  leg3.tan.mot.crd = 1;

/* zero integrators for rate and position loops */ leg1.lin.rat.ier = 0.0;
leg1.tan.rat.ier = 0.0;

leg2.lin.rat.ier = 0.0;
leg2.tan.rat.ier = 0.0;

leg3.lin.rat.ier = 0.0;
leg3.tan.rat.ier = 0.0;

/* set motor driver outputs to 0.0v */ dtoa_write(card[leg1.lin.mot.crd],leg1.lin.mot.chn,VOLTAGE,0.0);
dtoa_write(card[leg1.tan.mot.crd],leg1.tan.mot.chn,VOLTAGE,0.0);

dtoa_write(card[leg2.lin.mot.crd],leg2.lin.mot.chn,VOLTAGE,0.0);
dtoa_write(card[leg2.tan.mot.crd],leg2.tan.mot.chn,VOLTAGE,0.0);

dtoa_write(card[leg3.lin.mot.crd],leg3.lin.mot.chn,VOLTAGE,0.0);
dtoa_write(card[leg3.tan.mot.crd],leg3.tan.mot.chn,VOLTAGE,0.0);
}

/*-----------------------------------------------------------------*/
double lim(x,min,max)
double x,min,max;
{
    if (x < min) return(min);
    if (x > max) return(max);
``` myfunc50hz.2.28.90        Wed Feb 28 14:21:05 1990        4

```
                                                                          */
/*------------------------------------------------------------------------*/
do50hz()
{
atod_read(card[leg1.lin.rat.crd],leg1.lin.rat.chn,0x0c,&leg1.lin.rat.val);
atod_read(card[leg1.lin.pos.crd],leg1.lin.pos.chn,0x0c,&leg1.lin.pos.val);
atod_read(card[leg1.tan.rat.crd],leg1.tan.rat.chn,0x0c,&leg1.tan.rat.val);
atod_read(card[leg1.tan.pos.crd],leg1.tan.pos.chn,0x0c,&leg1.tan.pos.val);
atod_read(card[leg1.rad.rat.crd],leg1.rad.rat.chn,0x0c,&leg1.rad.rat.val);
atod_read(card[leg1.rad.pos.crd],leg1.rad.pos.chn,0x0c,&leg1.rad.pos.val);

atod_read(card[leg2.lin.rat.crd],leg2.lin.rat.chn,0x0c,&leg2.lin.rat.val);
atod_read(card[leg2.lin.pos.crd],leg2.lin.pos.chn,0x0c,&leg2.lin.pos.val);
atod_read(card[leg2.tan.rat.crd],leg2.tan.rat.chn,0x0c,&leg2.tan.rat.val);
atod_read(card[leg2.tan.pos.crd],leg2.tan.pos.chn,0x0c,&leg2.tan.pos.val);
atod_read(card[leg2.rad.rat.crd],leg2.rad.rat.chn,0x0c,&leg2.rad.rat.val);
atod_read(card[leg2.rad.pos.crd],leg2.rad.pos.chn,0x0c,&leg2.rad.pos.val);

atod_read(card[leg3.lin.rat.crd],leg3.lin.rat.chn,0x0c,&leg3.lin.rat.val);
atod_read(card[leg3.lin.pos.crd],leg3.lin.pos.chn,0x0c,&leg3.lin.pos.val);
atod_read(card[leg3.tan.rat.crd],leg3.tan.rat.chn,0x0c,&leg3.tan.rat.val);
atod_read(card[leg3.tan.pos.crd],leg3.tan.pos.chn,0x0c,&leg3.tan.pos.val);
atod_read(card[leg3.rad.rat.crd],leg3.rad.rat.chn,0x0c,&leg3.rad.rat.val);
atod_read(card[leg3.rad.pos.crd],leg3.rad.pos.chn,0x0c,&leg3.rad.pos.val);

/* convert tangential meas. to rad and sec, right hand rule, thumb out */ hc.phi1 = leg1.tan.pos.val*TAN_POS_SF;
hc.phi2 = leg2.tan.pos.val*TAN_POS_SF;
hc.phi3 = leg3.tan.pos.val*TAN_POS_SF;

/* convert radial meas. to rad and sec, positive leg top in */ hc.the1 = -leg1.rad.pos.val*RAD_POS_SF;
hc.the2 = -leg2.rad.pos.val*RAD_POS_SF;
hc.the3 = -leg3.rad.pos.val*RAD_POS_SF;

/* convert linear meas. to inches, positive leg extnded */ hc.d1 = -leg1.lin.pos.val*LIN_POS_SF + LIN_POS_OFF;
hc.d2 = -leg2.lin.pos.val*LIN_POS_SF + LIN_POS_OFF;
hc.d3 = -leg3.lin.pos.val*LIN_POS_SF + LIN_POS_OFF;

/* convert linear tachs to positive leg extending */ leg1.lin.rat.val = -leg1.lin.rat.val;
leg2.lin.rat.val = -leg2.lin.rat.val;
leg3.lin.rat.val = -leg3.lin.rat.val;
```

```
/* controller */ hc.velx = 0.0;
hc.vely = 0.0;
hc.velz = 0.0;

hc.wx = 0.0;
hc.wy = 0.0;
hc.wz = 0.0;

if (vp.bol == BOWL_ON)
    {
    px = -lim(vp.my/MAX_MOMENT,-1.0,1.0);
    py = -lim(vp.mx/MAX_MOMENT,-1.0,1.0);
    bowl(px,py,&xc,&yc,&zc,&phic,&thac,&psic);

hc.velx = vp.kp*(xc - hc.delx);
    hc.vely = vp.kp*(yc - hc.dely);
    hc.velz = vp.kp*(zc - (LIN_POS_OFF + hc.delz));

hc.wx = vp.kp*(phic - hc.phi);
    hc.wy = vp.kp*(thac - hc.theta);
    hc.wz = vp.kp*(psic - hc.psi);
    }
if (vp.bol == BOWL_OFF)
    {
    if (vp.mod == RATE_MODE)
        {
        xc = 0.0;
        yc = 0.0;
        zc = 0.0;
        if (vp.dof == SIX_DOF)
            {
            xc = lim( vp.fy/MAX_FORCE,-MAX_TRANS,MAX_TRANS);
            yc = lim( vp.fx/MAX_FORCE,-MAX_TRANS,MAX_TRANS);
            zc = lim(-vp.fz/MAX_FORCE,-MAX_TRANS,MAX_TRANS);
            }
        hc.velx = vp.kp*(xc - hc.delx);
        hc.vely = vp.kp*(yc - hc.dely);
        hc.velz = vp.kp*(zc - (LIN_POS_OFF + hc.delz));

phic = lim( vp.my/MAX_MOMENT,-MAX_ANGLE,MAX_ANGLE);
        thac = lim( vp.mx/MAX_MOMENT,-MAX_ANGLE,MAX_ANGLE);
        psic = lim(-vp.mz/MAX_MOMENT,-MAX_ANGLE,MAX_ANGLE);

hc.wx = vp.kp*(phic - hc.phi);
``` myfunc50hz.2.28.90          Wed Feb 28 14:21:05 1990          6

```
    hc.wy = vp.kp*(thac - hc.theta);
    hc.wz = vp.kp*(psic - hc.psi);
} if (vp.mod == POS_MODE)
{
    if (vp.dof == SIX_DOF)
    {
        if (vp.fy >  FORCE_DBAND) hc.velx =  1.0;
        if (vp.fy < -FORCE_DBAND) hc.velx = -1.0;
        if (vp.fx >  FORCE_DBAND) hc.vely =  1.0;
        if (vp.fx < -FORCE_DBAND) hc.vely = -1.0;
        if (vp.fz >  FORCE_DBAND) hc.velz = -0.5;
        if (vp.fz < -FORCE_DBAND) hc.velz =  0.5;

if (vp.my >  MOM_DBAND) hc.wx =  0.3;
        if (vp.my < -MOM_DBAND) hc.wx = -0.3;
        if (vp.mx >  MOM_DBAND) hc.wy =  0.3;
        if (vp.mx < -MOM_DBAND) hc.wy = -0.3;
        if (vp.mz >  MOM_DBAND) hc.wz =  0.3;
        if (vp.mz < -MOM_DBAND) hc.wz = -0.3;

if (hc.delx >  1.5*MAX_TRANS && hc.velx > 0.0) {hc.velx = 0.0;DOIP}
        if (hc.delx < -1.5*MAX_TRANS && hc.velx < 0.0) {hc.velx = 0.0;DOIP}
        if (hc.dely >  1.5*MAX_TRANS && hc.vely > 0.0) {hc.vely = 0.0;DOIP}
        if (hc.dely < -1.5*MAX_TRANS && hc.vely < 0.0) {hc.vely = 0.0;DOIP} if (hc.phi   >  1.0*MAX_ANGLE && hc.wx > 0.0) {hc.wx = 0.0;DOIP}
        if (hc.phi   < -1.0*MAX_ANGLE && hc.wx < 0.0) {hc.wx = 0.0;DOIP}
        if (hc.theta >  1.0*MAX_ANGLE && hc.wy > 0.0) {hc.wy = 0.0;DOIP}
        if (hc.theta < -1.0*MAX_ANGLE && hc.wy < 0.0) {hc.wy = 0.0;DOIP}
        if (hc.psi   >  2.0*MAX_ANGLE && hc.wz > 0.0) {hc.wz = 0.0;DOIP}
        if (hc.psi   < -2.0*MAX_ANGLE && hc.wz < 0.0) {hc.wz = 0.0;DOIP}
    }
} controller(&hc);

leg1.tan.rat.cmd = V_PER_RPS*hc.ph1dot;
leg2.tan.rat.cmd = V_PER_RPS*hc.ph2dot;
leg3.tan.rat.cmd = V_PER_RPS*hc.ph3dot;

leg1.lin.rat.cmd = V_PER_IPS*hc.d1dot;
leg2.lin.rat.cmd = V_PER_IPS*hc.d2dot;
leg3.lin.rat.cmd = V_PER_IPS*hc.d3dot;

/* leg1 tangential rate loop */
```

```
myfunc50hz.2.28.90          Wed Feb 28 14:21:05 1990          7 leg1.tan.rat.err = leg1.tan.rat.cmd - leg1.tan.rat.val;
if (vp.igo == INT_ON)
    leg1.tan.rat.ier = lim(leg1.tan.rat.ier +
        DELT*leg1.tan.rat.err,-INT_LIM,INT_LIM);
leg1.tan.mot.val = lim(vp.kr*leg1.tan.rat.ier,-VOLT_LIM,VOLT_LIM);

/* leg2 tangential rate loop */ leg2.tan.rat.err = leg2.tan.rat.cmd - leg2.tan.rat.val;
if (vp.igo == INT_ON)
    leg2.tan.rat.ier = lim(leg2.tan.rat.ier +
        DELT*leg2.tan.rat.err,-INT_LIM,INT_LIM);
leg2.tan.mot.val = lim(vp.kr*leg2.tan.rat.ier,-VOLT_LIM,VOLT_LIM);

/* leg3 tangential rate loop */ leg3.tan.rat.err = leg3.tan.rat.cmd - leg3.tan.rat.val;
if (vp.igo == INT_ON)
    leg3.tan.rat.ier = lim(leg3.tan.rat.ier +
        DELT*leg3.tan.rat.err,-INT_LIM,INT_LIM);
leg3.tan.mot.val = lim(vp.kr*leg3.tan.rat.ier,-VOLT_LIM,VOLT_LIM);

/* leg1 linear rate loop */ leg1.lin.rat.err = leg1.lin.rat.cmd - leg1.lin.rat.val;
if (vp.igo == INT_ON)
    leg1.lin.rat.ier = lim(leg1.lin.rat.ier +
        DELT*leg1.lin.rat.err,-INT_LIM,INT_LIM);
leg1.lin.mot.val = lim(vp.kr*leg1.lin.rat.ier,-VOLT_LIM,VOLT_LIM);

/* leg2 linear rate loop */ leg2.lin.rat.err = leg2.lin.rat.cmd - leg2.lin.rat.val;
if (vp.igo == INT_ON)
    leg2.lin.rat.ier = lim(leg2.lin.rat.ier +
        DELT*leg2.lin.rat.err,-INT_LIM,INT_LIM);
leg2.lin.mot.val = lim(vp.kr*leg2.lin.rat.ier,-VOLT_LIM,VOLT_LIM);

/* leg3 linear rate loop */ leg3.lin.rat.err = leg3.lin.rat.cmd - leg3.lin.rat.val;
if (vp.igo == INT_ON)
    leg3.lin.rat.ier = lim(leg3.lin.rat.ier +
        DELT*leg3.lin.rat.err,-INT_LIM,INT_LIM);
leg3.lin.mot.val = lim(vp.kr*leg3.lin.rat.ier,-VOLT_LIM,VOLT_LIM);

/* actuator commands */
```

```
myfunc50hz.2.28.90          Wed Feb 28 14:21:05 1990          8 dtoa_write(card[leg1.tan.mot.crd],leg1.tan.mot.chn,VOLTAGE,leg1.tan.mot.val);
dtoa_write(card[leg1.lin.mot.crd],leg1.lin.mot.chn,VOLTAGE,leg1.lin.mot.val);

dtoa_write(card[leg2.tan.mot.crd],leg2.tan.mot.chn,VOLTAGE,leg2.tan.mot.val);
dtoa_write(card[leg2.lin.mot.crd],leg2.lin.mot.chn,VOLTAGE,leg2.lin.mot.val);

dtoa_write(card[leg3.tan.mot.crd],leg3.tan.mot.chn,VOLTAGE,leg3.tan.mot.val);
dtoa_write(card[leg3.lin.mot.crd],leg3.lin.mot.chn,VOLTAGE,leg3.lin.mot.val);
}
``` hc4.c        Fri Jun  1 16:41:27 1990       1

```
/* Changes: 12/21/89 DJL Moved #defines for constants and typedef for  */
/*                       sensor data structure to hc4.h.  "If"ed out   */
/*                       main.  Replaced #include for math.h with      */
/*                       mymath.h.                                     */

/* ..............Velocity Control Subroutine and Main Driver ................. */

/*     Project: Virtual Pivot Hand Controler (IR&D F4925-3000-2822)           */

/*     Programmed By:    William C. Marshall
                         Systems & Research Center
                         Honeywell, Inc.
                         3660 Technology Drive
                         Minneapolis, MN 55418
                         (612) 782 - 7266
                         29 Nov 1989

/*     Description:      Theory of the C-Language code of this subprogram is
                         documented in the technical memo "Adaptable 6-DOF
                         Virtual Pivot Handcontroller: System Equations",
                         by W.C. Marshall, Dec 1989.
                                                                              */

/* ...................................... Start of Global Declarations ...... */ include "../include/mymath.h"
include "../include/hc4.h"
#include <stdio.h>

/* List of functions used by "main" */ void controller();
void orient();
void quat();
void euler();
void matmpy();
void matran();
void matinv();
void transpose();
void mmult();

/* MISCELANEOUS */ static float epb[3][3];          /* Euler transformation matrix (Base-To-Platform)  */
static float ebp[3][3];          /* Euler transformation matrix (Platform-To-Base)  */
```

```
hc4.c            Fri Jun  1 16:41:27 1990            2 static float e1b[3][3];                /* Leg #1 euler matrix Sb to L1           */
static float e2b[3][3];                /* Leg #2 euler matrix Sb to L2           */
static float e3b[3][3];                /* Leg #3 euler matrix Sb to L3           */ static float e1[3][3];                 /* Leg #1 angular rate transform matrix   */
static float e2[3][3];                 /* Leg #2 angular rate transform matrix   */
static float e3[3][3];                 /* Leg #3 angular rate transform matrix   */
static float e1in[3][3];               /* Inverse of e1 matrix                   */
static float e2in[3][3];               /* Inverse of e2 matrix                   */
static float e3in[3][3];               /* Inverse of e3 matrix                   */

/* KEY PARAMETER LIST DECLARATIONS */ static float ANGLE[3];     /* Euler angles phi,theta,psi wrt Sb          */
static float ARATE[3];     /* Platform rates Wx,Wy,Wz in Sb              */
static float RP[3];        /* Platform centerposition wrt Sb             */
static float VEL[3];       /* Platform velocity wrt Sb                   */
static float R1[3];        /* Position of Leg #1 at top in Sb            */
static float R2[3];        /* Position of Leg #2 at top in Sb            */
static float R3[3];        /* Position of Leg #3 at top in Sb            */
static float V1[3];        /* Velocity of Leg#1 at top in Sb             */
static float V2[3];        /* Velocity of Leg#2 at top in Sb             */
static float V3[3];        /* Velocity of Leg#3 at top in Sb             */
static float RP1[3];       /* Rel. position of Leg #1 wrt RP[i]          */
static float RP2[3];       /* Rel. position of Leg #2 wrt RP[i]          */
static float RP3[3];       /* Rel. position of Leg #3 wrt RP[i]          */
static float XP[3];        /* Platform Sp unit vector coordinates        */
static float YP[3];        /* Platform Sp unit vector coordinates        */
static float ZP[3];        /* Platform Sp unit vector coordinates        */
static float OUT1[3];      /* Motor rates for Leg #1                     */
static float OUT2[3];      /* Motor rates for Leg #2                     */
static float OUT3[3];      /* Motor rates for Leg #3                     */ static float PHIC;         /* Commanded initial roll orientation         */
static float THEC;         /* Commanded initial pitch orientation        */
static float PSIC;         /* Commanded initial yaw orientation          */
static float DELR[3];      /* Commanded initial position vector          */
static float RPC[3];       /* Platform position vector wrt Sb            */
static float R1b[3];       /*Computed Leg vectors in Sb                  */
static float R2b[3];       /*Computed Leg vectors in Sb                  */
static float R3b[3];       /*Computed Leg vectors in Sb                  */
static float D1b[3];       /*Computed Leg vectors in Sb at B1            */
static float D2b[3];       /*Computed Leg vectors in Sb at B2            */
static float D3b[3];       /*Computed Leg vectors in Sb at B3            */
static float _D1[3],_D2[3],_D3[3]; /*Computed Leg vectors in SLi at Bi   */
static float epbc[3][3];   /* Computed euler matrix Sb to Sp             */
```

```
hc4.c            Fri Jun  1 16:41:27 1990            3 static float ek2[3][3],ek3[3][3];       /* Constant matrix Sb to SL1 for D1[3]  */
  static float TEMP[3];                   /* Temporary vector storage             */ static float d1,d2,d3;
  static float the1,the2,the3;
  static float phi1,phi2,phi3;
  static float sthe1,sthe2,sthe3;
  static float cthe1,cthe2,cthe3;
  static float sphi1,sphi2,sphi3;
  static float cphi1,cphi2,cphi3;
  static float ph1d,ph2d,ph3d;
  static float the1d,the2d,the3d;
  static float d1d,d2d,d3d;
  static float determ,temp;
  static float d1c,d2c,d3c,d1c2,d2c2,d3c2;
  static float phi1c,phi2c,phi3c;
  static float the1c,the2c,the3c;
  static float wrate[3];
  static float pvel[3];

/*.....................................................DEBUGING DECLARATIONS.................*/
  static int BUG00 = 1;    /* -1 means set IC from pos. & angles          */
  static int BUG01 = 1;    /* -1 means print epb[i][j]                    */
  static int BUG02 = 0;    /* -1 means print ebp[i][j]                    */
  static int BUG03 = 0;    /* -1 means print R1,R2,R3,RP                  */
  static int BUG04 = 1;    /* -1 means print phid & d1d outputs           */
  static int BUG05 = 1;    /* -1 means print V1 vectors                   */
  static int BUG06 = 1;    /* -1 means print euler angles                 */
  static int BUG07 = 1;    /* -1 means print IC attitude commands         */
  static int BUG08 = 1;    /* -1 means print euler matrix result          */
  static int BUG09 = 1;    /* -1 means print d1c,the1c, phi1c             */
  static int BUG10 = 1;    /* -1 means print d1,the1, phi1                */
  static int BUG11 = 0;    /* -1 means print RPC[j]                       */
  static int BUG12 = 1;    /* -1means print D1[j]                         */
/* ********************************************************************* */
#if 0
main()

int j;

struct sensor sdata;
  j = 0;
``` hc4.c          Fri Jun  1 16:41:27 1990          5

```
if(BUG08>0) printf("  08:epbc[0][j] = %2.3f %2.3f %2.3f \n",epbc[0][0],epbc[0][1],epbc[0][2]);
if(BUG08>0) printf("  08:epbc[1][j] = %2.3f %2.3f %2.3f \n",epbc[1][0],epbc[1][1],epbc[1][2]);
if(BUG08>0) printf("  08:epbc[2][j] = %2.3f %2.3f %2.3f \n",epbc[2][0],epbc[2][1],epbc[2][2]);
if(BUG09>0) printf("  09:phic  =%2.3f %2.3f %2.3f     \n",phic,phi2c,phi3c);
if(BUG09>0) printf("  09:thec  =%2.3f %2.3f %2.3f     \n",thec,the2c,the3c);
if(BUG09>0) printf("  09: dic  =%2.3f %2.3f %2.3f     \n",d1c,d2c,d3c);
if(BUG10>0) printf("  10:phi1 =%2.3f %2.3f %2.3f      \n",phi1,phi2,phi3);
if(BUG10>0) printf("  10:the1 =%2.3f %2.3f %2.3f      \n",the1,the2,the3);
if(BUG10>0) printf("  10:  d1 =%2.3f %2.3f %2.3f      \n",d1,d2,d3);
if(BUG11>0) printf("  11:RPC =%2.3f %2.3f %2.3f       \n",RPC[0],RPC[1],RPC[2]);
if(BUG12>0) printf("  12:D1[j] =%2.3f %2.3f %2.3f     \n",_D1[0],_D1[1],_D1[2]);
if(BUG12>0) printf("  12:D2[j] =%2.3f %2.3f %2.3f     \n",_D2[0],_D2[1],_D2[2]);
if(BUG12>0) printf("  12:D3[j] =%2.3f %2.3f %2.3f     \n",_D3[0],_D3[1],_D3[2]);

printf(" j= %3d\n",j);
scanf("%2d",&j);
return;
}
#endif

/*............................. Start of Orientation Control Function ............... */ void orient(sdata)
struct sensor *sdata;
{
int i,j;

euler(PHIC,THEC,PSIC,epbc);       /* Compute commanded euler matrix Sb to Sp) */

RPC[0] = DELR[0];                 /* Compute position vector of platform wrt base */
RPC[1] = DELR[1];
RPC[2] = DELR[2] - HEIGHT;

R1b[0] = RPC[0] + RPLAT*epbc[0][0];  /* Compute Leg vectors wrt Sb */
R1b[1] = RPC[1] + RPLAT*epbc[0][1];
R1b[2] = RPC[2] + RPLAT*epbc[0][2];

R2b[0] = RPC[0] + RPLAT*(SR3D2*epbc[1][0] - HALF*epbc[0][0]);
R2b[1] = RPC[1] + RPLAT*(SR3D2*epbc[1][1] - HALF*epbc[0][1]);
R2b[2] = RPC[2] + RPLAT*(SR3D2*epbc[1][2] - HALF*epbc[0][2]);

R3b[0] = RPC[0] + RPLAT*(-SR3D2*epbc[1][0] - HALF*epbc[0][0]);
R3b[1] = RPC[1] + RPLAT*(-SR3D2*epbc[1][1] - HALF*epbc[0][1]);
R3b[2] = RPC[2] + RPLAT*(-SR3D2*epbc[1][2] - HALF*epbc[0][2]);
                                  /* Compute Di vectors wrt Sb (Bi to Pi)     */
```

```
hc4.c          Fri Jun  1 16:41:27 1990       6

D1b[0] = R1b[0] - RBASE;
D1b[1] = R1b[1];
D1b[2] = R1b[2];

D2b[0] = R2b[0] + HALF*RBASE;
D2b[1] = R2b[1] - SR3D2*RBASE;
D2b[2] = R2b[2];

D3b[0] = R3b[0] + HALF*RBASE;
D3b[1] = R3b[1] + SR3D2*RBASE;
D3b[2] = R3b[2];

/*Compute Leg length coord.  d1    */
d1c2 = .0;
for(j=0;j<3;j++) d1c2 = d1c2 + D1b[j]*D1b[j];
d2c2 = .0;
for(j=0;j<3;j++) d2c2 = d2c2 + D2b[j]*D2b[j];
d3c2 = .0;
for(j=0;j<3;j++) d3c2 = d3c2 + D3b[j]*D3b[j];

/* Rotate to Leg Base frame       */
ek2[0][0] = -HALF;
ek2[1][0] = -SR3D2;
ek2[2][0] = .0;
ek2[0][1] = SR3D2;
ek2[1][1] = -HALF;
ek2[2][1] = .0;
ek2[0][2] = .0;
ek2[1][2] = .0;
ek2[2][2] = 1.0;

ek3[0][0] = -HALF;
ek3[1][0] = SR3D2;
ek3[2][0] = .0;
ek3[0][1] = -SR3D2;
ek3[1][1] = -HALF;
ek3[2][1] = .0;
ek3[0][2] = .0;
ek3[1][2] = .0;
ek3[2][2] = 1.0;

for (j=0;j<3;j++) _D1[j] = D1b[j];
matmpy(ek2,D2b,_D2);
matmpy(ek3,D3b,_D3);

/* Compute phi & theta  motor angles  */
d1 = sqrt(d1c2);
``` hc4.c          Fri Jun  1 16:41:27 1990          7

```c
d2c = sqrt(d2c2);
d3c = sqrt(d3c2);

phi1c = atan2(_D1[1],d1c);
the1c = asin(-_D1[0]/sqrt(_D1[0]*_D1[0] + _D1[2]*_D1[2]));

phi2c = atan2(_D2[1],d2c);
the2c = asin(-_D2[0]/sqrt(_D2[0]*_D2[0] + _D2[2]*_D2[2]));

phi3c = atan2(_D3[1],d3c);
the3c = asin(-_D3[0]/sqrt(_D3[0]*_D3[0] + _D3[2]*_D3[2]));

/*..........*/                                    /* Set output values   */ sdata->d1    = d1c;
sdata->the1  = the1c;
sdata->phi1  = phi1c;
sdata->d2    = d2c;
sdata->the2  = the2c;
sdata->phi2  = phi2c;
sdata->d3    = d3c;
sdata->the3  = the3c;
sdata->phi3  = phi3c;

return;
}
/*................................................End of orient function..............*/

/*............................................ Start of Velocity Control Function ..............*/ void controller(sdata)

struct sensor *sdata;

{
int j;
float det1,det2,det3;
                                             /* Transfer input data from global storage */
    d1   = sdata->d1;
    the1 = sdata->the1;
    phi1 = sdata->phi1;
    d2   = sdata->d2;
    the2 = sdata->the2;
```

```
hc4.c        Fri Jun  1 16:41:27 1990        8 phi2= sdata->phi2;
    d3   = sdata->d3;
    the3 = sdata->the3;
    phi3 = sdata->phi3;

VEL[0]   = sdata->velx;              /* Get desired linear & angular velocities */
    VEL[1]   = sdata->vely;
    VEL[2]   = sdata->velz;
/*---djl---
    ARATE[0] = sdata->wx;
    ARATE[1] = sdata->wy;
    ARATE[2] = sdata->wz;
---djl---*/
    pvel[0]  = sdata->velx;
    pvel[1]  = sdata->vely;
    pvel[2]  = sdata->velz;
    wrate[0] = sdata->wx;
    wrate[1] = sdata->wy;
    wrate[2] = sdata->wz;

sthe1 = sin(the1);                   /* Compute sines & cosines     */
    cthe1 = cos(the1);
    sphi1 = sin(phi1);
    cphi1 = cos(phi1);

sthe2 = sin(the2);
    cthe2 = cos(the2);
    sphi2 = sin(phi2);
    cphi2 = cos(phi2);

sthe3 = sin(the3);
    cthe3 = cos(the3);
    sphi3 = sin(phi3);
    cphi3 = cos(phi3);

R1[0] = -d1*sthe1 + RBASE;           /* Compute R1,R2,R3,RP vectors */
    R1[1] =  d1*cthe1*sphi1;
    R1[2] = -d1*cthel*cphi1;

R2[0] = d2*((HALF*sthe2)   - (SR3D2*cthe2*sphi2)) -  RBD2;
    R2[1] = d2*((-SR3D2*sthe2) - (HALF*cthe2*sphi2))  +  SR3D2*RBASE;
    R2[2] = -d2*cthe2*cphi2;

R3[0] = d3*((HALF*sthe3)   +( SR3D2*cthe3*sphi3)) -  RBD2;
    R3[1] = d3*((SR3D2*sthe3)  - (HALF*cthe3*sphi3))  -  SR3D2*RBASE;
    R3[2] = -d3*cthe3*cphi3;
```

```
hc4.c          Fri Jun  1 16:41:27 1990        9

/* Compute Platform origin position vector*/
        for(j=0; j<3; j++) RP[j] = (1.0/3.0)*(R1[j] + R2[j] + R3[j]);

/* Compute euler matrix epb[i][j] */
        for(j=0; j<3; j++) XP[j] = (R1[j] - RP[j])/RPLAT;
        for(j=0; j<3; j++) YP[j] = (R2[j] - R3[j])*(SR3D3/RPLAT);
        ZP[0] = (XP[1]*YP[2]) - (XP[2]*YP[1]);
        ZP[1] = (XP[2]*YP[0]) - (XP[0]*YP[2]);
        ZP[2] = (XP[0]*YP[1]) - (XP[1]*YP[0]);

for(j=0; j<3; j++) epb[0][j] = XP[j];
        for(j=0; j<3; j++) epb[1][j] = YP[j];
        for(j=0; j<3; j++) epb[2][j] = ZP[j];

/* Obtain euler matrix ebp[i][j]          */
/*----dj1----*/
/*
*/
        transpose(epb,ebp);

matmpy(ebp,pvel,VEL);

matmpy(ebp,wrate,ARATE);
/*----dj1----*/
                                           /* Compute Leg postion wrt Sp in Sb       */
        for(j=0; j<3; j++) RP1[j] = R1[j] - RP[j];
        for(j=0; j<3; j++) RP2[j] = R2[j] - RP[j];
        for(j=0; j<3; j++) RP3[j] = R3[j] - RP[j];

/* Compute linear velocity of legs        */
        V1[0] = VEL[0] + (ARATE[1]*RP1[2] - ARATE[2]*RP1[1]);
        V1[1] = VEL[1] + (ARATE[2]*RP1[0] - ARATE[0]*RP1[2]);
        V1[2] = VEL[2] + (ARATE[0]*RP1[1] - ARATE[1]*RP1[0]);

V2[0] = VEL[0] + (ARATE[1]*RP2[2] - ARATE[2]*RP2[1]);
        V2[1] = VEL[1] + (ARATE[2]*RP2[0] - ARATE[0]*RP2[2]);
        V2[2] = VEL[2] + (ARATE[0]*RP2[1] - ARATE[1]*RP2[0]);

V3[0] = VEL[0] + (ARATE[1]*RP3[2] - ARATE[2]*RP3[1]);
        V3[1] = VEL[1] + (ARATE[2]*RP3[0] - ARATE[0]*RP3[2]);
        V3[2] = VEL[2] + (ARATE[0]*RP3[1] - ARATE[1]*RP3[0]);

/* Compute rate transform matrices        */
        e1[0][0] =  .0;
        e1[1][0] =  d1*cthel*cphi1;
        e1[2][0] =  d1*cthel*sphi1;
        e1[0][1] = -d1*cthel;
        e1[1][1] = -d1*sthel*sphi1;
```

```
hc4.c          Fri Jun  1 16:41:27 1990         10 e1[2][1] =    d1*sthe1*cphi1;
        e1[0][2] =   -sthe1;
        e1[1][2] =    cthe1*sphi1;
        e1[2][2] =   -cthe1*cphi1;

e2[0][0] =   d2*(-SR3D2*cthe2*cphi2);
        e2[1][0] =   d2*(  -HALF*cthe2*cphi2);
        e2[2][0] =   d2*cthe2*sphi2;
        e2[0][1] =   d2*((HALF*cthe2)  +   (SR3D2*sthe2*sphi2));
        e2[1][1] =   d2*((-SR3D2*cthe2) +(HALF*sthe2*sphi2));
        e2[2][1] =   d2*sthe2*cphi2;
        e2[0][2] =   (( HALF*sthe3) -   (SR3D2*cthe3*sphi3));
        e2[1][2] =   ((-SR3D2*sthe3) -   (HALF*cthe3*sphi3));
        e2[2][2] =   -cthe3*cphi3;

e3[0][0] =   d3*(SR3D2*cthe3*cphi3);
        e3[1][0] =   d3*(  -HALF*cthe3*cphi3);
        e3[2][0] =   d3*cthe3*sphi3;
        e3[0][1] =   d3*((HALF*cthe3)  +   (SR3D2*sthe3*sphi3));
        e3[1][1] =   d3*((SR3D2*cthe3) +(HALF*sthe3*sphi3));
        e3[2][1] =   d3*sthe3*cphi3;
        e3[0][2] =   (( HALF*sthe3) +   (SR3D2*cthe3*sphi3));
        e3[1][2] =   ((SR3D2*sthe3) -   (HALF*cthe3*sphi3));
        e3[2][2] =   -cthe3*cphi3;

matinv(e1,e1in,&det1);
        matinv(e2,e2in,&det2);                        /* Form final matrices   */
        matinv(e3,e3in,&det3);

matmpy(e1in,V1,OUT1);                         /* Compute motor rate commands  */
        matmpy(e2in,V2,OUT2);
        matmpy(e3in,V3,OUT3);

ph1d =  OUT1[0];
        ph2d =  OUT2[0];
        ph3d =  OUT3[0];
        d1d  =  OUT1[2];
        d2d  =  OUT2[2];
        d3d  =  OUT3[2];

ANGLE[0] = atan2(epb[1][2],epb[2][2]);       /* Compute ONE SET of euler angles (of 12!)  */
        ANGLE[1] = asin(-epb[0][2]);                 /* This set is psi,theta,phi (in order) Sb to Sp */
        ANGLE[2] = atan2(epb[0][1],epb[0][0]);
        */
``` hc4.c        Fri Jun  1 16:41:27 1990        11

```
                                          /* Transfer Output Data */
        sdata->ph1dot  = ph1d;
        sdata->ph2dot  = ph2d;
        sdata->ph3dot  = ph3d;

sdata->d1dot   = d1d;
        sdata->d2dot   = d2d;
        sdata->d3dot   = d3d;

sdata->delx    = RP[0];
        sdata->dely    = RP[1];
        sdata->delz    = RP[2];

sdata->phi     = ANGLE[0];
        sdata->theta   = ANGLE[1];
        sdata->psi     = ANGLE[2];

return;
}
/*................................................End of Velocity Control Fn........................*/ void quat(q1,q2,q3,q4, trans)                       /*Compute new transformation matrix   */ float q1,q2,q3,q4;
float trans[3][3];

{
        trans[0][0] =  (q1*q1 + q2*q2 + q3*q3 + q4*q4);
        trans[0][1] =  2.*(q2*q3 + q1*q4);
        trans[0][2] =  2.*(q2*q4 - q1*q3);
        trans[1][0] =  2.*(q2*q3 - q1*q4);
        trans[1][1] =  (q1*q1 - q2*q2 + q3*q3 - q4*q4);
        trans[1][2] =  2.*(q3*q4 + q1*q2);
        trans[2][0] =  2.*(q2*q4 + q1*q3);
        trans[2][1] =  2.*(q3*q4 - q1*q2);
        trans[2][2] =  (q1*q1 - q2*q2 - q3*q3 + q4*q4);

return;
}
/*................*/ void euler(phi,the,psi,mat)
``` hc4.c        Fri Jun  1 16:41:27 1990        12

```c
float phi,the,psi;
float mat[3][3];
{
    float sphi,cphi,sthe,cthe,spsi,cpsi;

/* ............ Euler Matrix Computation ............*/
    /* Compute euler rotation matrix from Loc.Vert. to Body */ sthe = sin(the);
    cthe = cos(the);
    spsi = sin(psi);
    cpsi = cos(psi);
    sphi = sin(phi);
    cphi = cos(phi);

mat[0][0] = cthe*cpsi;
    mat[0][1] = cthe*spsi;
    mat[0][2] = -sthe;
    mat[1][0] = sphi*sthe*cpsi - cphi*spsi;
    mat[1][1] = sphi*sthe*spsi + cphi*cpsi;
    mat[1][2] = sphi*cthe;
    mat[2][0] = cphi*sthe*cpsi + sphi*spsi;
    mat[2][1] = cphi*sthe*spsi - sphi*cpsi;
    mat[2][2] = cphi*cthe;

return;
}
/* ............
   ..........*/ void matmpy(a,b,c)                  /* Matrix(3x3) times vector(1x3)*/
                                    /* Calling sequence:            */
                                    /*     float m[3][3] ;          */
                                    /*     float v[3] ;             */
                                    /*     matmpy(m,v,v)            */
    float a[3][3] ;
    float b[3] ;
    float c[3] ;
{
    float t[3] ;

t[0] = a[0][0]*b[0] + a[0][1]*b[1] + a[0][2]*b[2] ;
    t[1] = a[1][0]*b[0] + a[1][1]*b[1] + a[1][2]*b[2] ;
```

```
hc4.c           Fri Jun  1 16:41:27 1990      13 t[2] = a[2][0]*b[0] + a[2][1]*b[1] + a[2][2]*b[2] ;

c[0] = t[0] ;
          c[1] = t[1] ;
          c[2] = t[2] ;
          }
/* ................................................. End "matmpy" Code ................................................*/ void matran(a,b,c)                        /* Matrix transposition multiply*/
                                          /* Matrix(3x3) times vector(1x3)*/
                                          /* Calling sequence:            */
                                          /*     float m[3][3] ;          */
                                          /*     float v[3] ;             */
                                          /*     matran(m,v,v)            */ float a[3][3] ;
     float b[3] ;
     float c[3] ;

{
     float t[3] ;

t[0] = a[0][0]*b[0] + a[1][0]*b[1] + a[2][0]*b[2] ;
     t[1] = a[0][1]*b[0] + a[1][1]*b[1] + a[2][1]*b[2] ;
     t[2] = a[0][2]*b[0] + a[1][2]*b[1] + a[2][2]*b[2] ;

c[0] = t[0] ;
     c[1] = t[1] ;
     c[2] = t[2] ;
     }
/* ................................................. End "matran" Code ................................................*/ void matinv(a,b,det)         /* Matrix (3x3) Inverse & Determinant)   */

/* Calling sequence:                     */
                             /*     float m[3][3] ;                   */
                             /*     float n[3][3] ;                   */
                             /*     float *det                        */
                             /*     matinv(m,n,&det)     */

/* Cramer's Rule used to compute inverse.                            */
     /* Inverse of m to n (with determinant returned always) .         */
     /* If det "smaller" than "tiny", inverse not returned   .         */ float a[3][3] ;
     float b[3][3] ;
```

```
hc4.c              Fri Jun  1 16:41:27 1990        14 float *det ;

{
  *det    =    a[0][0] * (a[1][1]*a[2][2] - a[1][2]*a[2][1])
             + a[1][0] * (a[2][1]*a[0][2] - a[0][1]*a[2][2])
             + a[2][0] * (a[0][1]*a[1][2] - a[1][1]*a[0][2]) ;

if (fabs(*det)<TINY) return;

temp = 1.0/(*det) ;

b[0][0] =  temp * (a[1][1]*a[2][2] - a[1][2]*a[2][1]);
  b[1][0] = -temp * (a[1][0]*a[2][2] - a[1][2]*a[2][0]);
  b[2][0] =  temp * (a[1][0]*a[2][1] - a[1][1]*a[2][0]);

b[0][1] = -temp * (a[0][1]*a[2][2] - a[0][2]*a[2][1]);
  b[1][1] =  temp * (a[0][0]*a[2][2] - a[0][2]*a[2][0]);
  b[2][1] = -temp * (a[0][0]*a[2][1] - a[0][1]*a[2][0]);

b[0][2] =  temp * (a[0][1]*a[1][2] - a[0][2]*a[1][1]);
  b[1][2] = -temp * (a[0][0]*a[1][2] - a[0][2]*a[1][0]);
  b[2][2] =  temp * (a[0][0]*a[1][1] - a[0][1]*a[1][0]);
  }

/* ............................ End "matinv" Code ............................ */ void mmult(a,b,c)                   /* Matrix(3x3) times matrix(3x3) */
                                    /* Calling sequence:             */
                                    /*    float a[3][3] ;            */
                                    /*    float b[3][3] ;            */
                                    /*    float c[3][3] ;            */
                                    /*    mmult(a,b,c) ;             */
                                    /*    (a)x(b) -> (c)             */ float a[3][3] ;
  float b[3][3] ;
  float c[3][3] ;

{
  c[0][0] = a[0][0]*b[0][0] + a[0][1]*b[1][0] + a[0][2]*b[2][0] ;
  c[1][0] = a[1][0]*b[0][0] + a[1][1]*b[1][0] + a[1][2]*b[2][0] ;
  c[2][0] = a[2][0]*b[0][0] + a[2][1]*b[1][0] + a[2][2]*b[2][0] ;

c[0][1] = a[0][0]*b[0][1] + a[0][1]*b[1][1] + a[0][2]*b[2][1] ;
  c[1][1] = a[1][0]*b[0][1] + a[1][1]*b[1][1] + a[1][2]*b[2][1] ;
  c[2][1] = a[2][0]*b[0][1] + a[2][1]*b[1][1] + a[2][2]*b[2][1] ;

c[0][2] = a[0][0]*b[0][2] + a[0][1]*b[1][2] + a[0][2]*b[2][2] ;
```

```
hc4.c       Fri Jun  1 16:41:27 1990        15 c[1][2] = a[1][0]*b[0][2] + a[1][1]*b[1][2] + a[1][2]*b[2][2] ;
    c[2][2] = a[2][0]*b[0][2] + a[2][1]*b[1][2] + a[2][2]*b[2][2] ;
}
/*................................................................. End "mmult" Code ........*/ void transpose(a,b)                 /* Matrix(3x3) transpose to matrix(3x3)*/
                                    /* Calling sequence:                  */
                                    /*     float a[3][3] ;                */
                                    /*     float b[3][3] ;                */
                                    /*     transpose(a,b,) ;              */
                                    /*     (a)' -> (b)                    */
                                    /*                                   */ float a[3][3] ;
    float b[3][3] ;
    {
    b[0][0] = a[0][0] ;
    b[1][0] = a[0][1] ;
    b[2][0] = a[0][2] ;
    b[0][1] = a[1][0] ;
    b[1][1] = a[1][1] ;
    b[2][1] = a[1][2] ;
    b[0][2] = a[2][0] ;
    b[1][2] = a[2][1] ;
    b[2][2] = a[2][2] ;
    }
/*................................................................. End "mmult" Code ........*/
``` hc4.h          Fri Jan  5 17:31:18 1990          1

```
#define RPLAT   2.5                 /* Platform radius to leg             */
#define RBASE   2.5                 /* Base radius to leg                 */
#define HEIGHT  10.0                /* Mean height of leg at 90 deg.      */
#define RADDEG  57.29577951         /* Degrees per radian                 */
#define DEGRAD  0.01745329          /* Radians per degree                 */
#define TINY    1.0e-20             /* A "small" number                   */
#define SR3D2   0.86602540          /* sqrt(3)/2                          */
#define SR3D3   0.57735027          /* sqrt(3)/3                          */
#define RPD2    RPLAT*0.5
#define RBD2    RBASE*0.5
#define HALF    0.5

/* Interface structure for "HandCntrl" I/O data */ typedef struct sensor
    {
    float d1,the1,phi1;             /* Leg #1 length & two angles (Input)    */
    float d2,the2,phi2;             /* Leg #2 length & two angles (Input)    */
    float d3,the3,phi3;             /* Leg #3 length & two angles (Input)    */
    float delx,dely,delz;           /* Platform offset from zero position    */
    float phi,theta,psi;            /* Platform roll,pitch,yaw (radians)     */
    float velx,vely,velz;           /* Desired translational rates           */
    float wx,wy,wz;                 /* Desired angular rates (rad./sec.)     */
    float ph1dot,d1dot;             /* Angle & leg rate commands (Output)    */
    float ph2dot,d2dot;             /* Angle & leg rate commands (Output)    */
    float ph3dot,d3dot;             /* Angle & leg rate commands (Output)    */
    };
``` dtoa.h                Wed Nov  8 15:04:28 1989          1

/* User defines specifying type of input conversion desired. */ define OFFSET_BINARY   0
define VOLTAGE         1
define CURRENT         2 define MAX_CARDS       16

/* Each 605's register block takes up 0x10 bytes.
   The nomenclature is as follows:
   ch1lsb - ch4lsb : channels 1 through 4 least significant bytes.
   ch1msb - ch4msb : channels 1 through 4 most significant bytes.
*/ struct register_format
        {
        unsigned char undef0;
        unsigned char ch1lsb;
        unsigned char undef1;
        unsigned char ch1msb;
        unsigned char undef2;
        unsigned char ch2lsb;
        unsigned char undef3;
        unsigned char ch2msb;
        unsigned char undef4;
        unsigned char ch3lsb;
        unsigned char undef5;
        unsigned char ch3msb;
        unsigned char undef6;
        unsigned char ch4lsb;
        unsigned char undef7;
        unsigned char ch4msb;
        };

/* Data stored by driver for each card defined. */ struct card_data
        {
        struct register_format *reg_base;
        double range;
        };

atod.h          Thu Nov  9 15:44:20 1989     1

```
/* The DISABLE_LEVEL must be set to a level higher than any interrupt
   that could result in one atod driver call being suspended and another
   executed.  This is necessary so that driver queues don't become corrupted.
*/ define DISABLE_LEVEL           7
define IO_CHANNEL_CAPACITY     16

/* QUEUE_LENGTH may be increased if one wishes to queue many measurements
   to one card group.  This could occur if one wanted to measure many channels
   starting after some external trigger.
*/ define QUEUE_LENGTH            16 define CONVERSION_COMPLETE     1
define EMPTY_QUEUE             -1

/* Options defines. */ define DIFFM                   0x01
define EXTRIG                  0x02
#define OB_TO_D                 0x04
#define POLL                    0x08

/* The control and data registers for one card group(one 600, five 601's)
   take up 0x10 bytes.  The nomenclature is as follows:
   cntrl0 - cntrl5 : Each card's control register.
   datamsb : The controlling 600's most significant byte data register.
   datalsb : The controlling 600's least significant byte data register.
*/ struct register_format {
                unsigned char undef0;
                unsigned char cntrl0;
                unsigned char undef1;
                unsigned char datamsb;
                unsigned char undef2;
                unsigned char datalsb;
                unsigned char undef3;
                unsigned char cntrl1;
                unsigned char undef4;
                unsigned char cntrl2;
``` atod.h          Thu Nov  9 15:44:20 1989          2

```
                unsigned char undef5;
                unsigned char cntrl3;
                unsigned char undef6;
                unsigned char cntrl4;
                unsigned char undef7;
                unsigned char cntrl5;
                };

/* Data stored for use upon command completion. */ struct parameter_packet  {
                unsigned long channel;
                unsigned long options;
                unsigned long *datamb;
                unsigned long *statmb;
                };

/* Data defining each card group. */ struct card_data        {
                struct register_format *reg_base;
                unsigned long channel_number;
                double range;
                };

/* Queue format for each card group. */ struct queue_format     {
                struct parameter_packet queue[QUEUE_LENGTH];
                unsigned long queue_head;
                unsigned long queue_tail;
                };
```

```
cmath.c         Fri Jun  1 16:41:27 1990          1 include "../include/mymath.h"

define sign(x)   ((x >= 0) ? 1 : -1)
define PI        3.14159265358979323846 double atan2(y,x)
double y;
double x;
{
if (x >  0)   return(atan(y/x));
if (x <  0)   return(sign(y)*(PI-atan(fabs(y/x))));
if (y != 0)   return(sign(y)*PI/2);
return(0);
} double csign(a,b)
double a,b;
{
double x,y;
if (b < 0.0)
        x = -1.0;
    else
        x = 1.0;
y = x*a;
return(y);
} double myfmod(x,y)
double x,y;
{
double z;
z = x/y;
return (double)((z - (double)((int)z))*y);
}
```

```
mymath.h            Wed Dec 20 15:16:06 1989        1

/*      @(#)math.h 1.23 88/03/03 SMI    */

/*
 * Copyright (c) 1988 by Sun Microsystems, Inc.
 */

/*              #include <math.h> defines all the public functions implemented in libm.a,
                                                                    functions implemented in libc.a.
 */ ifndef M_SQRT1_2
include <floatingpoint.h>
/* Contains definitions for types and /*      4.3 BSD functions: math.h       4.6     9/11/85 */ extern int      finite();
extern double   fabs(), floor(), ceil(), rint();
extern double   hypot();
extern double   copysign();
extern double   sqrt();
extern double   modf(), frexp();
extern double   asinh(), acosh(), atanh();
extern double   erf(), erfc();
extern double   exp(), expm1(), log(), log10(), log1p(), pow();
extern double   lgamma();
extern double   j0(), j1(), jn(), y0(), y1(), yn();
extern double   sin(), cos(), tan(), asin(), acos(), atan(), atan2();
extern double   sinh(), cosh(), tanh();
extern double   cbrt();

/*      Sun definitions.        */ enum fp_pi_type {                               /* Implemented precisions for trigonometric
                                                        argument reduction. */
        fp_pi_infinite  = 0,                    /* Infinite-precision approximation to pi. */
        fp_pi_66        = 1,                    /* 66-bit approximation to pi. */
        fp_pi_53        = 2                     /* 53-bit approximation to pi. */
};

extern enum fp_pi_type fp_pi ;  /* Pi precision to use for trigonometric
                                                        argument reduction. */
```

```
mymath.h          Wed Dec 20 15:16:06 1989          3 define RETURNFLOAT(x)      ( union {double _d ; float _f ) _kluge ; _kluge._f = (x) ; return _kluge._d ; )
define ASSIGNFLOAT(x,y)    ( union {double _d ; float _f ) _kluge ; _kluge._d = (y) ; x = _kluge._f ; )
endif /*      1386 returns float results on stack as extendeds, same as double */ ifdef i386
define FLOATFUNCTIONTYPE       float
#define RETURNFLOAT(x)          return (x)
#define ASSIGNFLOAT(x,y)        x = y
endif /*      So far everybody passes float parameters as 32 bits on stack, same as int.     */ define FLOATPARAMETER          int
define FLOATPARAMETERVALUE(x)  (*(float *)(&(x)))

extern int     ir_finite_();
extern FLOATFUNCTIONTYPE r_fabs_(), r_floor_(), r_ceil_(), r_rint_();
extern FLOATFUNCTIONTYPE r_hypot_();
extern FLOATFUNCTIONTYPE r_copysign_();
extern FLOATFUNCTIONTYPE r_sqrt_();
extern FLOATFUNCTIONTYPE r_asinh_(), r_acosh_(), r_atanh_();
extern FLOATFUNCTIONTYPE r_erf_(), r_erfc_();
extern FLOATFUNCTIONTYPE r_exp_(), r_expm1_(), r_log_(), r_log10_(), r_log1p_();
extern FLOATFUNCTIONTYPE r_pow_();
extern FLOATFUNCTIONTYPE r_lgamma_();
extern FLOATFUNCTIONTYPE r_j0_(), r_j1_(), r_jn_(), r_y0_(), r_y1_(), r_yn_();
extern FLOATFUNCTIONTYPE r_sin_(), r_cos_(), r_tan_(), r_asin_(), r_acos_();
extern FLOATFUNCTIONTYPE r_atan_(), r_atan2_();
extern FLOATFUNCTIONTYPE r_sinh_(), r_cosh_(), r_tanh_();
extern FLOATFUNCTIONTYPE r_cbrt_();
extern int ir_ilogb_(), ir_irint_(), ir_signbit_() ;
extern int ir_isinf_(), ir_isnan_(), ir_isnormal_(), ir_issubnormal_(), ir_iszero_() ;
extern enum fp_class_type ir_fp_class_();
extern FLOATFUNCTIONTYPE r_nextafter_(), r_remainder_() ;
extern FLOATFUNCTIONTYPE r_log2_(), r_exp10_(), r_exp2_(), r_aint_(), r_anint_() ;
extern int ir_nint_() ;
extern FLOATFUNCTIONTYPE r_fmod_();
extern FLOATFUNCTIONTYPE r_logb_(), r_significand_(), r_scalb_(), r_scalbn_();
extern FLOATFUNCTIONTYPE r_min_subnormal_(), r_max_subnormal_();
extern FLOATFUNCTIONTYPE r_min_normal_(), r_max_normal_();
extern FLOATFUNCTIONTYPE r_infinity_(), r_quiet_nan_(), r_signaling_nan_();
extern void r_sincos_();

/*      Constants, variables, and functions from System V */
``` mymath.h        Wed Dec 20 15:16:06 1989      4 define _ABS(x)  ((x) < 0 ? -(x) : (x))

define HUGE_VAL    (infinity())    /* Produces IEEE Infinity. */
define HUGE        (infinity())    /* For historical compatibility. */ define DOMAIN      1
define SING        2
define OVERFLOW    3
define UNDERFLOW   4
define TLOSS       5
define PLOSS       6 struct exception {
    int type;
    char *name;
    double arg1;
    double arg2;
    double retval;
};

extern int signgam;

extern double fmod();
extern int matherr();

/* First three have to be defined exactly as in values.h including spacing! */ define M_LN2       0.6931471805599453094
define M_PI        3.1415926535897932846
define M_SQRT2     1.4142135623730950488 define M_E         2.7182818284590452354
define M_LOG2E     1.4426950408889634074
define M_LOG10E    0.4342944819032518276
define M_LN10      2.3025850929940456840
define M_PI_2      1.5707963267948966192
define M_PI_4      0.7853981633974483096
define M_1_PI      0.3183098861837906715
define M_2_PI      0.6366197723675813430
define M_2_SQRTPI  1.1283791670955125739
define M_SQRT1_2   0.7071067811865475244 define _POLY1(x, c)  ((c)[0] * (x) + (c)[1])
define _POLY2(x, c)  (_POLY1((x), (c)) * (x) + (c)[2])
define _POLY3(x, c)  (_POLY2((x), (c)) * (x) + (c)[3])
define _POLY4(x, c)  (_POLY3((x), (c)) * (x) + (c)[4])
define _POLY5(x, c)  (_POLY4((x), (c)) * (x) + (c)[5])

```
mymath.h         Wed Dec 20 15:16:06 1989          5 define _POLY6(x, c)    (_POLY5((x), (c)) * (x) + (c)[6])
define _POLY7(x, c)    (_POLY6((x), (c)) * (x) + (c)[7])
#define _POLY8(x, c)    (_POLY7((x), (c)) * (x) + (c)[8])
#define _POLY9(x, c)    (_POLY8((x), (c)) * (x) + (c)[9])

/*
        Deprecated functions for compatibility with past.
        Changes planned for future.
*/ extern double cabs();   /* Use double hypot(x,y)
                           Traditional cabs usage is confused -
                           is its argument two doubles or one struct?  */
extern double drem();   /* Use double remainder(x,y)
                           drem will disappear in a future release.    */
extern double gamma();  /* Use double lgamma(x)
                           to compute log of gamma function.
                           Name gamma is reserved for true gamma function
                           to appear in a future release.              */
extern double ldexp();  /* Use double scalbn(x,n)
                           ldexp may disappear in a future release     */ endif
```

```
bowl.c          Fri Jun 1 16:41:27 1990      1 include "../include/mymath.h"

/*................................................BOWL DEMO DECLARATIONS...........................*/
static double RADIUS = 6.0;         /* Radius of bowl shape centered above origin    */
static double ALP = .3;
static double PID2 = 1.57079633;    /* = (1/2)*PI radians or 90 deg.                 */
/*...............*/ void bowl(PX,PY,xbowl,ybowl,zbowl,phibo,thebo,psibo)

double PX,PY;                                   /* Bowl parameters      -1.<PI<+1.       */
double *xbowl,*ybowl,*zbowl;      /* Bowl rel.coord. wrt platform coord. origin    */
double *phibo,*thebo,*psibo  ;    /* Bowl surface attitudes                        */
{
double phi,the;

phi = ALP*PX;
the = ALP*PY;
*xbowl = -RADIUS*sin(the)*cos(phi);
*ybowl =  RADIUS*sin(phi);
*zbowl =  RADIUS*cos(the)*cos(phi) - RADIUS;
*phibo = -phi;
*thebo = -the;
*psibo = 0.0;
/*----
*xbowl =  RADIUS*sin(the);
*ybowl = -RADIUS*cos(the)*sin(phi);
*zbowl =  RADIUS*cos(the)*cos(phi) - RADIUS;
*phibo = -phi;
*thebo = -the;
*psibo = 0.0;
---*/
}
``` cmd_declarations.h        Thu Sep  6 10:15:05 1990        1

/* system routines */ extern  help();
extern  usage();

/* vp routines */ extern vp_bol();
extern vp_ena();
extern vp_dof();
extern vp_lin();
extern vp_mod();
extern vp_rot();
extern vp_sys();
extern vp_xxx();

static ARG vptab[] =
{
        ('b',PROC,(int *)vp_bol,        "change BREAKOUT characteristics"),
        ('d',PROC,(int *)vp_dof,        "toggle 3/6 DEGREES-of-freedom"),
        ('e',PROC,(int *)vp_ena,        "ENABLE integrators"),
        ('g',PROC,(int *)vp_xxx,        "change GAINS"),
        ('l',PROC,(int *)vp_lin,        "change LINEAR spring rate"),
        ('m',PROC,(int *)vp_mod,        "toggle rate/position MODE"),
        ('r',PROC,(int *)vp_rot,        "change ROTATIONAL spring rate"),
        ('s',PROC,(int *)vp_sys,        "display system STATUS"),
};

define VP_TAB_SIZE     (sizeof(vptab)    / sizeof(ARG))

CMD_STRUCT cmdtab[] =
{
        "vp",   VP_TAB_SIZE,    (int *)usage,   vptab,
        "help", 0,              (int *)help,    0,
        "",     0,              0,              0
};

```
cmd_definition.h         Wed Nov  8 13:23:24 1989          1 typedef struct {
        char       *cmd;
        int         size;
        int        *procedure;
        ARG        *Argtab;
} CMD_STRUCT;

makefile            Thu Aug 30 17:17:48 1990          1

ASM     = a20
CC      = ccom -I/n/orion/mnt0/packages/ghs/include -X20 -X22 -X29 -X35 -X98 -X99 -X122 -X129 -X140

OFILES  = iru_isr.obj myfunc50hz.obj hc4.obj cmath.obj bowl.obj hyst.obj
LFILES  = iru_isr,myfunc50hz,hc4,cmath,bowl,hyst lib: lsrlib.olb
lsrlib.olb: $(OFILES)
        lib68 lsrlib=$(LFILES)

.c.obj:
        $(CC) $*.c
        $(ASM) $*,$*-$*
        rm $*.asm $*.lst

.asm.obj:
        $(ASM) $*,$*-$*

.SUFFIXES: .obj .asm .x .c
``` getargs.h        Wed Nov  8 13:23:24 1989        1

/*      Getargs.h       Typedefs and defines needed for getargs
*/ define INTEGER         0
define BOOLEAN         1
define CHARACTER       2
define STRING          3
define PROC            4 typedef struct
{
        unsigned        arg : 7 ;       /* Command line switch          */
        unsigned        type : 4 ;      /* variable type                */
        int             *variable ;     /* pointer to variable          */
        char            *errmsg ;       /* pointer to error message     */
}
ARG;

extern int getargs();

int_enter.h      Wed Nov  8 13:23:25 1989        1

/* this file does a complete context save of the 68881
   and saves all the 68020 registers.

int_exit.h must be included at subroutine exit time
   if this file is used.
*/
asm("   MOVEM.L D0-D7/A0-A5,-(SP)");
asm("   FSAVE   -(SP)");
asm("   TST.B   (SP)");
asm("   DC.L    $67000000C");                           /* beq to null save */
asm("   FMOVEM  FP0-FP7,-(SP)");
asm("   FMOVEM  FPCR/FPSR/FPIAR,-(SP)");
asm("   ST      -(SP)");                                /* null save */
asm("   NOP");

int_exit.h        Wed Nov  8 13:23:24 1989        1

/* this include file restores the 68881 after a context switch
   It also restors all 68020 registers and does an RTE on exit.

It must be used if int_enter.h was included on entry to
   the subroutine */ asm(" TST.B      (SP)");                              /* beq to null resotre */
asm(" DC.L       $6700000C");
asm(" ADDQ.L     #2,SP");
asm(" FMOVEM     (SP)+,FPCR/FPSR/FPIAR");
asm(" FMOVEM     (SP)+,FP0-FP7");
asm(" FRESTORE            (SP)+");                    /* null restore */
asm(" MOVEM.L    (SP)+,D0-D7/A0-A5");
asm(" RTE");

mem_map.h         Wed Nov  8 13:52:00 1989        1

/* Vmebus system memory map. */

/* MVME316, MVME600, MVME605 VIO, ADC and DAC definitions. */ define VIO_VME_START      0xFFFFE000 define ADC_IO_START       0x0400
define DAC1_IO_START      0x0000
define DAC2_IO_START      0x0200 define ADC_VME_START      (VIO_VME_START + ADC_IO_START)
define DAC1_VME_START     (VIO_VME_START + DAC1_IO_START)
define DAC2_VME_START     (VIO_VME_START + DAC2_IO_START)

/* MVME133 executive cpu definitions. */ define EXEC_CPU_DPRAM_START    0x200000
define EXEC_CPU_DPRAM_END      0x2FFFFF mfp.h          Wed Nov  8 13:23:24 1989                       1

```
define mfp_base       0xFFF80000 define mfp_gpip       (mfp_base + 0x01)
define mfp_aer        (mfp_base + 0x03)
#define mfp_ddr        (mfp_base + 0x05)
#define mfp_iera       (mfp_base + 0x07)
#define mfp_ierb       (mfp_base + 0x09)
#define mfp_ipra       (mfp_base + 0x0B)
#define mfp_iprb       (mfp_base + 0x0D)
#define mfp_isra       (mfp_base + 0x0F)
#define mfp_isrb       (mfp_base + 0x11)
#define mfp_imra       (mfp_base + 0x13)
#define mfp_imrb       (mfp_base + 0x15)
#define mfp_vr         (mfp_base + 0x17)
#define mfp_tacr       (mfp_base + 0x19)
#define mfp_tbcr       (mfp_base + 0x1B)
#define mfp_tcdcr      (mfp_base + 0x1D)
#define mfp_tadr       (mfp_base + 0x1F)
#define mfp_tbdr       (mfp_base + 0x21)
#define mfp_tcdr       (mfp_base + 0x23)
#define mfp_tddr       (mfp_base + 0x25)
#define mfp_scr        (mfp_base + 0x27)
#define mfp_ucr        (mfp_base + 0x29)
#define mfp_rsr        (mfp_base + 0x2B)
#define mfp_tsr        (mfp_base + 0x2D)
#define mfp_udr        (mfp_base + 0x2F)
``` pop_fpc_mot.h          Thu Nov  9 16:08:18 1989               1

```
asm(" TST.B     (SP)");
asm(" DC.L      $6700000C");
asm(" ADDQ.L    #2,SP");
asm(" FMOVEM    (SP)+,FPCR/FPSR/FPIAR");
asm(" FMOVEM    (SP)+,FP0-FP7");
asm(" FRESTORE  (SP)+");
``` push_fpc_mot.h         Thu Nov  9 16:08:14 1989               1

```
asm(" FSAVE     -(SP)");
asm(" TST.B     (SP)");
asm(" DC.L      $6700000C");
asm(" FMOVEM    FP0-FP7,-(SP)");
asm(" FMOVEM    FPCR/FPSR/FPIAR,-(SP)");
asm(" ST        -(SP)");
``` scc8530.h        Tue Nov 21 11:10:17 1989        1

/* scc8530.h - header file for scc chip */

/*
modification history
--------------------
01b,08nov87,dnw  fixed definition of SCC_WR4_SDLC (was 0x10, should be 0x20).
01a,06jul,llk+jlf written
*/ ifndef INCscc8530h
define INCscc8530h    1

/* bit values for write register 0 */
/* command register */

```
#define SCC_WR0_SEL_WR0         0x00
#define SCC_WR0_SEL_WR1         0x01
#define SCC_WR0_SEL_WR2         0x02
#define SCC_WR0_SEL_WR3         0x03
#define SCC_WR0_SEL_WR4         0x04
#define SCC_WR0_SEL_WR5         0x05
#define SCC_WR0_SEL_WR6         0x06
#define SCC_WR0_SEL_WR7         0x07
#define SCC_WR0_SEL_WR8         0x08
#define SCC_WR0_SEL_WR9         0x09
#define SCC_WR0_SEL_WR10        0x0a
#define SCC_WR0_SEL_WR11        0x0b
#define SCC_WR0_SEL_WR12        0x0c
#define SCC_WR0_SEL_WR13        0x0d
#define SCC_WR0_SEL_WR14        0x0e
#define SCC_WR0_SEL_WR15        0x0f
#define SCC_WR0_NULL_CODE       0x00
#define SCC_WR0_RST_INT         0x10
#define SCC_WR0_SEND_ABORT      0x18
#define SCC_WR0_EN_INT_RX       0x20
#define SCC_WR0_RST_TX_INT      0x28
#define SCC_WR0_ERR_RST         0x30
#define SCC_WR0_RST_HI_IUS      0x38
#define SCC_WR0_RST_RX_CRC      0x40
#define SCC_WR0_RST_TX_CRC      0x80
#define SCC_WR0_RST_TX_UND      0xc0
```

/* write register 2 */
/*   interrupt vector */

/* bit values for write register 1 */
/* tx/rx interrupt and data transfer mode definition */ scc8530.h        Tue Nov 21 11:10:17 1989

```
#define SCC_WR1_EXT_INT_EN      0x01
#define SCC_WR1_TX_INT_EN       0x02
#define SCC_WR1_PARITY          0x40
#define SCC_WR1_RX_INT_DIS      0x00
#define SCC_WR1_RX_INT_FIR      0x08
#define SCC_WR1_INT_ALL_RX      0x10
#define SCC_WR1_RX_INT_SPE      0x18
#define SCC_WR1_RDMA_RECTR      0x20
#define SCC_WR1_RDMA_FUNC       0x40
#define SCC_WR1_RDMA_EN         0x80

/* bit values for write register 3 */
/* receive parameters and control */ define SCC_WR3_RX_EN           0x01
define SCC_WR3_SYNC_CHAR       0x02
#define SCC_WR3_ADR_SEARCH      0x04
#define SCC_WR3_RX_CRC_EN       0x08
#define SCC_WR3_ENTER_HUNT      0x10
#define SCC_WR3_AUTO_EN         0x20
#define SCC_WR3_RX_5_BITS       0x00
#define SCC_WR3_RX_7_BITS       0x40
#define SCC_WR3_RX_6_BITS       0x80
#define SCC_WR3_RX_8_BITS       0xc0

/* bit values for write register 4 */
/* tx/rx misc parameters and modes */ define SCC_WR4_PAR_EN          0x01
define SCC_WR4_PAR_EVEN        0x02
#define SCC_WR4_SYNC_EN         0x00
#define SCC_WR4_1_STOP          0x04
#define SCC_WR4_2_STOP          0x0c
#define SCC_WR4_8_SYNC          0x00
#define SCC_WR4_16_SYNC         0x10
#define SCC_WR4_SDLC            0x20
#define SCC_WR4_EXT_SYNC        0x30
#define SCC_WR4_1_CLOCK         0x00
#define SCC_WR4_16_CLOCK        0x40
#define SCC_WR4_32_CLOCK        0x80
#define SCC_WR4_64_CLOCK        0xc0

/* bit values for write register 5 */
/* transmit parameter and controls */ define SCC_WR5_TX_CRC_EN       0x01
``` scc8530.h        Tue Nov 21 11:10:17 1989

```
#define SCC_WR5_RTS                 0x02
#define SCC_WR5_SDLC                0x04
#define SCC_WR5_TX_EN               0x08
define SCC_WR5_SEND_BRK            0x10 define SCC_WR5_TX_5_BITS           0x00
define SCC_WR5_TX_7_BITS           0x20
#define SCC_WR5_TX_6_BITS           0x40
#define SCC_WR5_TX_8_BITS           0x60
#define SCC_WR5_DTR                 0x80

/* write register 6 */
/* sync chars or sdlc address field */

/* write register 7 */
/* sync char or sdlc flag */

/* write register 8 */
/* transmit buffer */

/* bit values for write register 9 */
/* master interrupt control */ define SCC_WR9_VIS                 0x01
define SCC_WR9_NV                  0x02
#define SCC_WR9_DLC                 0x04
#define SCC_WR9_MIE                 0x08
#define SCC_WR9_STATUS_HI           0x10
#define SCC_WR9_NO_RST              0x00
#define SCC_WR9_CH_B_RST            0x40
#define SCC_WR9_CH_A_RST            0x80
#define SCC_WR9_HDWR_RST            0xc0

/* bit values for write register 10 */
/* misc tx/rx control bits */ define SCC_WR10_6_BIT_SYNC         0x01
define SCC_WR10_LOOP_MODE          0x02
#define SCC_WR10_ABORT_UND          0x04
#define SCC_WR10_MARK_IDLE          0x08
#define SCC_WR10_ACT_POLL           0x10
#define SCC_WR10_NRZ                0x00
#define SCC_WR10_NRZI               0x20
#define SCC_WR10_FM1                0x40
#define SCC_WR10_FM0                0x60
#define SCC_WR10_CRC_PRESET         0x80
``` scc8530.h          Tue Nov 21 11:10:17 1989          4

/* bit values for write register 11 */
/* clock mode control */

```
#define SCC_WR11_OUT_XTAL       0x00
#define SCC_WR11_OUT_TX_CLK     0x01
#define SCC_WR11_OUT_BR_GEN     0x02
#define SCC_WR11_OUT_DPLL       0x03
#define SCC_WR11_TRXC_OI        0x04
#define SCC_WR11_TX_RTXC        0x00
#define SCC_WR11_TX_TRXC        0x08
#define SCC_WR11_TX_BR_GEN      0x10
#define SCC_WR11_TX_DPLL        0x18
#define SCC_WR11_RX_RTXC        0x00
#define SCC_WR11_RX_TRXC        0x20
#define SCC_WR11_RX_BR_GEN      0x40
#define SCC_WR11_RX_DPLL        0x60
#define SCC_WR11_RTXC_XTAL      0x80
```

/* write register 12 */
/* lower byte of baud rate generator time constant */

/* write register 13 */
/* upper byte of baud rate generator time constant */

/* bit values for write register 14 */
/* misc control bits */

```
#define SCC_WR14_BR_EN          0x01
#define SCC_WR14_BR_SRC         0x02
#define SCC_WR14_DTR_FUNC       0x04
#define SCC_WR14_AUTO_ECHO      0x08
#define SCC_WR14_LCL_LOOP       0x10
#define SCC_WR14_NULL           0x00
#define SCC_WR14_SEARCH         0x20
#define SCC_WR14_RST_CLK        0x40
#define SCC_WR14_DIS_DPLL       0x60
#define SCC_WR14_SRC_BR         0x80
#define SCC_WR14_SRC_RTXC       0xa0
#define SCC_WR14_FM_MODE        0xc0
#define SCC_WR14_NRZI           0xe0
```

/* bit values for write register 15 */
/* external/status interrupt control */

```
#define SCC_WR15_ZERO_CNT       0x02
#define SCC_WR15_CD_IE          0x08
#define SCC_WR15_SYNC_IE        0x10
``` scc8530.h        Tue Nov 21 11:10:17 1989

```
#define SCC_WR15_CTS_IE                 0x20
#define SCC_WR15_TX_UND_IE              0x40
#define SCC_WR15_BREAK_IE               0x80

/* bit values for read register 0 */
/* tx/rx buffer status and external status */ define SCC_RR0_RX_AVAIL                0x01
define SCC_RR0_ZERO_CNT                0x02
#define SCC_RR0_TX_EMPTY                0x04
#define SCC_RR0_CD                      0x08
#define SCC_RR0_SYNC                    0x10
#define SCC_RR0_CTS                     0x20
#define SCC_RR0_TX_UND                  0x40
#define SCC_RR0_BREAK                   0x80

/* bit values for read register 1 */ define SCC_RR1_ALL_SENT                0x01
define SCC_RR1_RES_CD_2                0x02
#define SCC_RR1_RES_CD_1                0x01
#define SCC_RR1_RES_CD_0                0x08
#define SCC_RR1_PAR_ERR                 0x10
#define SCC_RR1_RX_OV_ERR               0x20
#define SCC_RR1_CRC_ERR                 0x40
#define SCC_RR1_END_FRAME               0x80

/* read register 2 */
/* interrupt vector */

/* bit values for read register 3 */
/* interrupt pending register */ define SCC_RR3_B_EXT_IP                0x01
define SCC_RR3_B_TX_IP                 0x02
#define SCC_RR3_B_RX_IP                 0x04
#define SCC_RR3_A_EXT_IP                0x08
#define SCC_RR3_A_TX_IP                 0x10
#define SCC_RR3_A_RX_IP                 0x20

/* read register 8 */
/* receive data register */

/* bit values for read register 10 */
/* misc status bits */ define SCC_RR10_ON_LOOP                0x02
```

```
scc8530.h           Tue Nov 21 11:10:17 1989                    6 define SCC_RR10_LOOP_SEND              0x10
define SCC_RR10_2_CLK_MIS              0x40
#define SCC_RR10_1_CLK_MIS              0x80

/* read register 12 */
/* lower byte of time constant */

/* read register 13 */
/* upper byte of time constant */

/* bit values for read register 15 */
/* external/status ie bits */ define SCC_RR15_ZERO_CNT               0x02
define SCC_RR15_CD_IE                  0x08
#define SCC_RR15_SYNC_IE                0x10
#define SCC_RR15_CTS_IE                 0x20
#define SCC_RR15_TX_UND_IE              0x40
define SCC_RR15_BREAK_IE               0x80 endif system_vars.h       Wed Nov  8 13:23:24 1989                    1 char    prompt[11];
char    disp_str[4];
char    scr_zone[6];

vector_map.h        Tue Dec  5 15:17:04 1989                    1

/* Exception vector locations used. */ define TRAP14              0x0B8
define USER01              0x104        /* vec 0x41: icc        */
#define USER02              0x108        /* vec 0x42: iproto     */
#define USER03              0x10c        /* vec 0x43: button 1   */
#define USER04              0x110        /* vec 0x44: button 2   */
#define USER05              0x114        /* vec 0x45: button 3   */
#define USER06              0x11c        /* vec 0x46: button 4   */
#define TIMERA              0x1b4        /* vec 0x6d: timer a    */
define VMEIRQ3             0x3fc        /* vec 0xff: vme irq3   */ define IPROTO_XFER         0x42
define ICC_SP_RETURN       0x41
``` vio.h        Thu Nov  9 16:17:33 1989        1

```
/* 0x20 bytes are decoded for the bus interrupter module's registers.
   The nomenclature for the register is as follows:
   cr0 - cr3 : control registers 0 through 3.
   vr0 - vr0 : vector registers 0 through 3.
   srr : software reset register.
*/ struct bim_register_format
{
    unsigned char undef0;
    unsigned char cr0;
    unsigned char undef1;
    unsigned char cr1;
    unsigned char undef2;
    unsigned char cr2;
    unsigned char undef3;
    unsigned char cr3;
    unsigned char undef4;
    unsigned char vr0;
    unsigned char undef5;
    unsigned char vr1;
    unsigned char undef6;
    unsigned char vr2;
    unsigned char undef7;
    unsigned char vr3;
    unsigned char undef8;
    unsigned char srr;
    unsigned char undef[0x0E];
};
```

```
vp.h                Tue Oct 23 13:46:28 1990           1 define A_BASE_ADDR  0xfffe200
define A_RANGE      10.0
#define B_BASE_ADDR  0xfffe400
#define B_RANGE      10.0
#define C_BASE_ADDR  0xfffe000
#define C_RANGE      10.0
define C_CHANNELS   16 define IO_LEVEL     1
define VME_LEVEL    6
#define VECTOR       215
define BIM_ADDR     0xfffbf00 define THREE_DOF    0
define SIX_DOF      1
#define POS_MODE     0
#define RATE_MODE    1
#define INT_OFF      0
#define INT_ON       1
#define BOWL_OFF     0
define BOWL_ON      1 define DELT         0.02
define RATELIM      10.0
#define RPD          0.0175
#define TAN_POS_SF   2.35*RPD
#define RAD_POS_SF   2.35*RPD
#define LIN_POS_SF   0.167
#define LIN_POS_OFF  10.0
#define MAX_TRANS    1.5
#define MAX_ANGLE    0.25
#define FORCE_DBAND  5.0
#define MOM_DBAND    30.0
#define V_PER_RPS    7.162
#define V_PER_IPS    (7.500/4.0)
#define INT_LIM      10.0
define VOLT_LIM     10.0 extern double MAX_FORCE,MAX_MOMENT;
extern double glob[500][8];

extern struct vpdat
{
    short fx,fy,fz;
    short mx,my,mz;
    int igo,mod,dof,bol;
    double kp,kr;
``` vp.h         Tue Oct 23 13:46:28 1990                                2

```
double a,w;
int scum;
int run,ptr;
double xc,yc,zc;
double bo,hh;
double krb;
} vp;

extern struct
    {
    struct
        {
        int chn;
        int crd;
        double val;
        double cmd;
        double err;
        double ier;
        } rat,pos,mot;
    } lin,rad,tan;
} leg1,leg2,leg3;
```

Clsr_entry.h        Thu Nov  9 16:05:16 1989                         1

```
asm("   MOVEM.L D0-D2/A0-A1,-(SP)");
```

Clsr_exit.h         Thu Nov  9 16:05:16 1989                         1

```
asm("   MOVEM.L (SP)+,D0-D2/A0-A1");
asm("   RTE");
```

We claim:

1. A six degree-of-freedom virtual pivot controller comprising:
grip means for receiving externally applied force and torque;
force and torque sensing means, connected to said grip means, for sensing the force and torque, from up to six-degrees-of-freedom, applied to said grip means;
first support means, connected to said sensing means, for supporting said sensing means;
second support means for supporting said hand controller;
at least one variable-length member means having a first flexible connector attached to said first support means and a second flexible connector, attached to said second support means, for variable supporting said first support means, wherein said at least one variable-length member means comprises:
translation actuating means connected to said member means, for varying the length of said member means;
translational sensing means, connected to said member means, for sensing a length of said member means;
angular actuating means, connected to said member means, for angularly moving said member means relative to said second support means; and
angular sensing means, connected to said member means, or sensing an angular position of said member means relative to said second support means.

2. Controller of claim 1 further comprising processing and control means, connected to said force and torque sensing means, to said translational sensing means, to said angular sensing means, to said translation actuating means and to said angular actuating means, for receiving signals from said force and torque sensing means, said translational sensing means and said angular sensing means, and for sending signals to said translation actuating means and to said angular actuating means.

3. Controller of claim 2 wherein said processing and control means sends signals to an external device to be controlled by said hand controller, and receives signals for the external device.

4. Controller of claim 3 wherein any externally applied force and torque to said grip means is sensed by said force and torque sensing means which in turn sends signals indicating force and torque to said processing and control means which in turn sends signals indicating certain kinds of control to the external device being controlled which in turn sends signals of action and reflective force of the external device to said processing and control means which in turn sends signals of reflective force and movement to said translational actuating means and to said angular actuating means which in turn provide reflective force, torque and movement in response to the any externally applied force and torque to said grip means.

5. Controller of claim 4 wherein said grip means reflects a virtual pivot point of said grip means having to the spring-like reflective force and torque, and movement to the any externally applied force and torque.

6. Controller of claim 4 wherein a location of the virtual pivot point and magnitudes of the spring-like reflective force and torque and of movement may be varied via input information to said processing and control means.

7. A six degree-of-freedom virtual pivot hand controller comprising:
a handle;
a six-degree-of-freedom force and torque sensor connected to said handle;
first support means, connected to said force and torque sensor, for supporting said force and torque sensor;
at least one variable-length member assembly comprising:
a variable length member;
a first connector connected to said member and to said first support means;
a second connector connected to said member;
a linear actuator connected to said member;
a linear sensor connected to said linear actuator;
an angular actuator connected to said second connector; and
an angular sensor connected to said angular actuator; and
second support means, connected to said second connector, for supporting said hand controller.

8. Controller of claim 7 further comprising interface and control means, connected to said force and torque sensor, linear actuator, linear sensor, angular actuator, and angular sensor, for interfacing said control with an external device to be controlled, for receiving signals indicative of control inputs to said handle to control the external device, and for sending signals to said linear actuator and angular actuator.

9. Controller of claim 8 wherein:
control inputs to said handle result in reflective force and torque, and movement at said handle caused by said linear actuator and said angular actuator; and
the reflective force and movement reflect a virtual pivot having a spring-like return position, to said handle.

10. Controller of claim 9 wherein a location of the virtual pivot point and magnitudes of the reflective force and torque, and of movement may be varied via input information to said interface and control means.

11. Controller of claim 10 wherein:
said first connector is a ball joint;
said second connector is a universal joint;
said linear actuator comprises a first motor connected to said interface and control means, for drawing said linear actuator which changes length of said variable length member;
said linear sensor comprises:
a first tachometer connected to the first motor and to said interface and control means; and
a linear potentiometer connected to said linear actuator and to said interface and control means;
said angular actuator further comprises a second motor, connected to said interface and control means, for driving said angular actuator; and
said angular sensor comprises:
a first angular potentiometer connected to said universal joint and to said interface and control means;
a second angular potentiometer connected to said universal joint and to said interface and control means; and
a second tachometer connected to the second motor and to said interface and control means.

12. A six degree-of-freedom virtual pivot hand controller comprising:
- a handle;
- a six degree-of-freedom force and torque sensor connected to said handle;
- a base plate;
- a plurality of extendable legs attached to said force and torque sensor and to said base plate, wherein each extendable leg comprises:
  - a linear actuator for extending and shortening said extendable leg;
  - a first flexible joint for attaching said linear actuator to said force and torque sensor;
  - a second flexible joint for connecting said linear actuator to said base plate;
  - a linear sensor attached to said linear actuator for determining the length of said extendable leg;
  - an angular actuator attached to said second flexible joint for varying angles of inclination of said extendable leg relative to said base plate;
  - an angular sensor connected to said second flexible joint for measuring varying angles of inclination of said extendable leg relative to said base plate; and
- a processing and control means, connected to said torque and force sensor, to said linear and angular sensors, and to said linear and angular actuators, for receiving signals and from said linear and angular sensors, for processing the signals in relation to a device being controlled by said controller, and for sending signals to said linear and angular actuators to actuate said controller with a response to force and torque inputs.

* * * * *

UNITED STATES PATENT AND TRADEMARK OFFICE
CERTIFICATE OF CORRECTION

PATENT NO. : 5,223,776
DATED : June 29, 1993
INVENTOR(S) : RADKE ET AL.

It is certified that error appears in the above-indentified patent and that said Letters Patent is hereby corrected as shown below:

Column 135, line 36, cancel "translation" and substitute --translational--.

Column 135, line 40, cancel "translation" and substitute --translational--.

Column 136, line 46, after "motor" insert --,--.

Column 138, line 13, after "signals" insert -- from said force and torque sensor --.

Signed and Sealed this

Fifth Day of April, 1994

*Attest:*

BRUCE LEHMAN

*Attesting Officer*  *Commissioner of Patents and Trademarks*